US007907740B2

(12) United States Patent
Matsuzawa

(10) Patent No.: US 7,907,740 B2
(45) Date of Patent: Mar. 15, 2011

(54) ELECTROSTATIC ULTRASONIC TRANSDUCER DRIVE CONTROL METHOD, ELECTROSTATIC ULTRASONIC TRANSDUCER, ULTRASONIC SPEAKER USING THE SAME, AUDIO SIGNAL REPRODUCTION METHOD, ULTRA-DIRECTIONAL ACOUSTIC SYSTEM, AND DISPLAY DEVICE

(75) Inventor: Kinya Matsuzawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1134 days.

(21) Appl. No.: 11/566,803

(22) Filed: Dec. 5, 2006

(65) Prior Publication Data

US 2007/0154036 A1 Jul. 5, 2007

(30) Foreign Application Priority Data

Dec. 19, 2005 (JP) ................................ 2005-364371
Nov. 27, 2006 (JP) ................................ 2006-318700

(51) Int. Cl.
*H04R 3/00* (2006.01)
*H04R 25/00* (2006.01)
*H04B 3/00* (2006.01)

(52) U.S. Cl. .......................... 381/111; 381/191; 381/77

(58) Field of Classification Search .................... 381/77, 381/111, 190, 191, 337, 338; 367/181, 137, 367/170

See application file for complete search history.

(56) References Cited

U.S. PATENT DOCUMENTS 7,668,323 B2 * 2/2010 Miyazaki ...................... 381/190
7,769,193 B2 * 8/2010 Matsuzawa ................... 381/191

FOREIGN PATENT DOCUMENTS

| | | |
|---|---|---|
| JP | A-10-252444 | 9/1998 |
| JP | A-11-351196 | 12/1999 |
| JP | A 2000-50387 | 2/2000 |
| JP | A 2000-50392 | 2/2000 |
| JP | A-2004-312394 | 11/2004 |
| JP | A-2005-117103 | 4/2005 |
| JP | A-2005-223820 | 8/2005 |

* cited by examiner

*Primary Examiner* — Ping Lee
(74) *Attorney, Agent, or Firm* — Oliff & Berridge, PLC

(57) ABSTRACT

A Push-Pull-type electrostatic ultrasonic transducer includes a first electrode having a through hole, a second electrode having a through hole making a pair with the through hole of the first electrode, and a vibration film held between a pair of electrodes composed of the first and the second electrodes and having a conductive layer to which a direct-current bias voltage is applied, and holds the pair of electrodes and the vibration film. Assuming that λ is the wavelength of the carrier wave having a frequency shifted as a predetermined amount of frequency from the resonance frequency, which is the mechanical resonance frequency of the vibration film, the thickness t of each of the pair of electrodes is set to (λ/4)·n or roughly (λ/4)·n (where, λ is the wavelength of the ultrasonic wave, n is a positive odd number), and an alternating-current signal, which is a modulated wave obtained by modulating the carrier wave in the ultrasonic frequency band with a signal wave in an audible frequency band, is applied between the pair of electrodes.

4 Claims, 11 Drawing Sheets

(a) DOUBLE-SIDED ELECTRODE EVAPORATED FILM (b) STRUCTURE OF LAMINATING ELECTRODE LAYER WITH INSULATING POLYMERIC FILMS (c) STRUCTURE OF BONDING TWO SINGLE-SIDED ELECTRODE FILMS WITH ELECTRODE FACES CONTACTED (a) ACOUSTIC TUBE AND SOUND WAVE WITH MINIMUM OUTLET SOUND PRESSURE (b) ACOUSTIC TUBE AND SOUND WAVE WITH MAXIMUM OUTLET SOUND PRESSURE

| PRIMARY RESONANCE FREQUENCY OF FILM VIBRATION kHz | WAVELENGTH OF CARRIER WAVE mm | LENGTH OF ACOUSTIC TUBE mm |
|---|---|---|
| 30. 00 | 8. 50 | 2. 13 |
| 40. 00 | 6. 80 | 1. 70 |
| 50. 00 | 5. 67 | 1. 42 |
| 60. 00 | 4. 86 | 1. 21 |
| 70. 00 | 4. 25 | 1. 06 |
| 80. 00 | 3. 78 | 0. 94 |

FREQUENCY CHARACTERISTIC

ELECTROSTATIC ULTRASONIC TRANSDUCER DRIVE CONTROL METHOD, ELECTROSTATIC ULTRASONIC TRANSDUCER, ULTRASONIC SPEAKER USING THE SAME, AUDIO SIGNAL REPRODUCTION METHOD, ULTRA-DIRECTIONAL ACOUSTIC SYSTEM, AND DISPLAY DEVICE

BACKGROUND OF THE INVENTION

1. Field of the Invention

The present invention relates to an electrostatic ultrasonic transducer drive control method, an electrostatic ultrasonic transducer, an ultrasonic speaker using the same, an audio signal reproduction method, an ultra-directional acoustic system, and a display device capable of generating constant high sound pressure throughout a broad frequency range.

The present invention claims priority based on Japanese Patent Applications JP 2005-364371 filed on Dec. 19, 2005, and JP 2006-318700 filed Nov. 27, 2006, the contents of which being incorporated herein by reference.

2. Background Art

In the past, most ultrasonic transducers have been of resonance type using piezoelectric ceramic.

Here, FIG. 15 shows a configuration of such an ultrasonic transducer in the past. In the past, most ultrasonic transducers have been of resonance-type using piezoelectric ceramic as a vibrator element. The ultrasonic transducer shown in FIG. 15 performs both conversion from an electric signal to an ultrasonic wave and conversion from an ultrasonic wave to an electric signal (transmission and reception of an ultrasonic wave) using piezoelectric ceramic as the vibrator element. The bimorph-type ultrasonic transducer shown in FIG. 15 is composed of two piezoelectric ceramics 61, 62, a cone 63, a case 64, leads 65, 66, and a screen 67.

The piezoelectric ceramics 61, 62 are bonded with each other, and leads 65 and 66 are connected to the opposite sides to the bonded surfaces thereof, respectively.

Since the resonance-type ultrasonic transducer utilizes resonance of the piezoelectric ceramics, a preferable characteristic of transmitting and receiving the ultrasonic wave is obtained in a relatively narrow frequency band around the resonance frequency.

In contrast to the resonance-type ultrasonic transducer, electrostatic ultrasonic transducers have been known in the past as wide band oscillation-type ultrasonic transducers capable of generating high sound pressure throughout the high-frequency band. These electrostatic ultrasonic transducers are called Pull-type because the vibration films work only in the direction in which the vibration films are pulled towards fixed electrodes. FIG. 16 shows a specific configuration of a wide band oscillation-type ultrasonic transducer (Pull-type). The electrostatic ultrasonic transducer shown in FIG. 16 uses a dielectric member 131 (an insulation member) such as polyethylene terephthalate resin (PET) with a thickness of about 3 through 10 μm as the vibration member. The dielectric member 131 is provided with an upper electrode 132, which is formed as a metal foil such as aluminum, integrally formed on the upper surface thereof by, for example, vapor deposition, and with a lower electrode 133 so as to be contiguous with the lower surface of the dielectric member 131 made of. The lower electrode 133 is provided with a lead 152 connected thereto, and is fixed to a base plate 135 made of, for example, bakelite.

Further, the upper electrode 132 is provided with a lead 153 connected thereto, and the lead 153 is connected to the direct current bias power supply 150. It is arranged that the direct current bias power supply 150 continuously applies a direct current bias voltage of about 50 through 150V for absorbing the upper electrode to the upper electrode 132 so that the lower electrode 133 absorbs the upper electrode 132. The reference numeral 151 denotes a signal source.

A case 130 swages the dielectric member 131, the upper electrode 132, and the base 135 with metal rings 136, 137, 138, and a mesh 139.

A surface of the lower electrode 133 facing the dielectric member 131 is provided with a plurality of microscopic grooves of about several tens through several hundreds of micrometers having uneven shapes formed thereon. These microscopic grooves form gaps between the lower electrode 133 and the dielectric member 131, and accordingly, the distribution of the capacitance between the upper electrode 132 and the lower electrode 133 has a slight variation. These microscopic random grooves are formed by roughening the surface of the lower electrode 133 with a file by manual procedures. In electrostatic ultrasonic transducers, by thus forming an indefinitely large number of capacitors with gaps having different sizes or depths, the frequency characteristic of the ultrasonic transducer shown in FIG. 16 becomes of a wide band as illustrated with the curve Q1 in FIG. 17.

In the ultrasonic transducer having the above configuration, it is configured that a rectangular wave signal (50 through 150Vp-p) is applied between the upper electrode 132 and the lower electrode 133 in the condition in which the direct current bias voltage is applied to the upper electrode 132. It should be noted that as illustrated with the curve Q2 in FIG. 17, the frequency characteristic of the resonance-type ultrasonic transducer has the central frequency (the resonance frequency of piezoelectric ceramic) of, for example, 40 kHz, and the sound pressure of −30 dB from the maximum sound pressure in a frequency range of ±5 kHz with respect to the central frequency, which corresponds to the maximum sound pressure.

In contrast, the frequency characteristic of the wide band oscillation-type ultrasonic transducer having the above configuration is flat in a range from 40 kHz to nearly 100 kHz, and has the sound pressure of about ±6 dB in 100 kHz with respect to the maximum pressure (see Patent Documents 1, 2).

[Patent Document 1] JP-A-2000-50387

[Patent Document 2] JP-A-2000-50392

As described above, in contrast to the resonance-type ultrasonic transducer shown in FIG. 15, the electrostatic ultrasonic transducer shown in FIG. 16 has been known in the past as a wide band ultrasonic transducer (Pull-type) capable of generating relatively high sound pressure throughout a wide frequency band. However, as shown in FIG. 17, the maximum value of the sound pressure, of the resonance-type ultrasonic transducer is 130 dB or more whereas that of the electrostatic ultrasonic transducer is as low as 120 dB, which is slightly insufficient for utilizing the transducer as an ultrasonic speaker.

Here, explanations regarding the ultrasonic speaker will be presented. It tends to mean that AM modulation is executed on a signal in the ultrasonic frequency band called carrier wave in accordance with an audio signal (a signal in the audio frequency band) to drive the ultrasonic transducer with the modulated signal, thus an acoustic wave in the state in which the ultrasonic wave is modulated with the audio signal of a signal source is emitted in the air, and by nonlinearity of the air, the original audio signal is self-reproduced in the air.

More specifically, the principle is that since acoustic waves are compressional waves transmitted by the medium of air, dense portions and nondense portions dominantly appear in the air in the process of transmitting modulated ultrasonic waves, and since the velocity of sound is high in the dense portions and low in the nondense portions, distortion is generated in the modulated wave itself, and as a result, waveform separation into carrier waves (ultrasonic waves) and audible sound waves (original audio signals) occurs, thus we humans can only hear the audible sound (the original signals) with a frequency range of no higher than 20 kHz, which is generally called a parametric array effect.

Although the ultrasonic sound pressure no lower than 120 dB is required in order for sufficiently exerting the parametric effect described above, it is difficult for electrostatic ultrasonic transducers to achieve this numerical value, and accordingly, ceramic piezoelectric elements such as PZT or polymer piezoelectric elements such as PVDF have been mainly used as ultrasonic emitters.

However, piezoelectric elements each have an acute resonance point irrespective of the material thereof, and are put into practical use as the ultrasonic speakers by driving them in the resonance frequencies, and accordingly, the frequency ranges in which the high sound pressure is assured are extremely narrow. It can be said that they are narrow-band.

In general, the maximum audible frequency band of the human ears is said to be from 20 Hz to 20 kHz, and has a bandwidth of about 20 kHz. In other words, in the ultrasonic speakers, it is prevented to faithfully demodulate the original audio signal if the high sound pressure is not assured throughout the 20 kHz frequency band in the ultrasonic wave region. It will be easily understood that it is difficult to perform faithful reproduction (demodulation) in such a wide band as 20 kHz by the resonance-type ultrasonic speakers using the piezoelectric elements of the related art.

In fact, in the ultrasonic speakers using the resonance-type ultrasonic transducers of the related art, the following problems have arisen. 1. The narrow frequency band degrades the reproduced sound quality. 2. The modulation depth is limited to as large as about 0.5 because the demodulated sound is distorted with too large AM modulation depth. 3. If the input voltage is raised (the volume is turned up), the vibration of the piezoelectric element becomes unstable to cause the sound to get distorted, and with further raised voltage, the piezoelectric element itself might be damaged easily. 4. It is difficult to be formed as an array, with a large scale, or with a small size, and accordingly, the cost thereof is high.

In contrast, the ultrasonic speakers using the electrostatic ultrasonic transducers (Pull-type) shown in FIG. 16 can solve almost all problems the above technology of the related art has, but in turn has a problem that the absolute sound pressure is not sufficient for obtaining a sufficient sound volume of the demodulated sound although the wide band can be covered.

Further, since in the Pull-type ultrasonic transducers, the electrostatic force acts only in the direction for pulling the vibration films towards the fixed electrode side, and accordingly, the symmetric property in vibration of the vibration films (corresponding to the upper electrode 132 in FIG. 16) is not maintained, in the case in which the ultrasonic transducers are used for the ultrasonic speakers, there is a problem that the vibration of the vibration films directly cause audible sound.

In this regard, we have already proposed an ultrasonic transducer capable of generating an acoustic signal with a sufficiently high sound pressure level for obtaining the parametric array effect throughout a wide frequency band. This ultrasonic transducer is configured to hold a vibration film having a conductive layer between the a pair of fixed electrodes provided with through holes in the corresponding positions, and to apply an alternating-current signal to the pair of fixed electrodes in the condition in which the direct current bias voltage is applied to the vibration film.

This ultrasonic transducer, which is called a Push-Pull-type ultrasonic transducer, can not only provide sufficiently large vibration of the vibration film for obtaining the parametric array effect because the electrostatic attractive force and the electrostatic repulsive force act on the vibration film held between the pair of fixed electrodes simultaneously in the same directions according to the polarity of the alternating-current signal, but also generate higher sound pressure compared to the Pull-type ultrasonic transducer in the related art throughout the wide frequency band because the symmetric property of vibration is assured.

However, since the Push-Pull type ultrasonic transducer has the through holes, through which the sound passes, with the relatively small areas, it is problematically difficult for the Push-Pull-type ultrasonic transducer as it is to generate sufficient sound pressure in the air.

Therefore, even in the Push-Pull-type ultrasonic transducer having such a configuration, a technology for generating sufficient sound pressure is also required.

Further, if the high sound pressure is generated throughout a wide frequency range, an added value as an ultrasonic transducer increases.

SUMMARY OF THE INVENTION

The present invention is made in view of such circumstances, and has an object of providing a Push-Pull-type of electrostatic ultrasonic transducer capable of generating a higher intensity ultrasonic wave in the same driving conditions and for intending to improve the electro-acoustic energy conversion efficiency.

In order for achieving the object described above, a drive control method of an electrostatic ultrasonic transducer according to the invention includes a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied. In this case, a modulated wave obtained by modulating a carrier wave in an ultrasonic frequency band with a signal wave in an audible frequency band is applied between the pair of electrodes, the through holes provided to the pair of electrodes act as resonance tubes, and a mechanical resonance frequency of the vibration film and a acoustic resonance frequency of the through holes being shifted from each other.

In the drive method of the electrostatic ultrasonic transducer according to the invention composed of the above configuration, a plurality of through holes is provided to the first electrode and the second electrode at positions where the first electrode and the second electrode face each other, and the alternating-current signal, which is the drive signal, is applied to the pair of electrodes composed of the first and the second electrodes in the condition in which the direct-current bias voltage is applied to the conductive layer of the vibration film. Therefore, the vibration film held between the pair of electrodes is subjected to the electrostatic attractive force and the electrostatic repulsive force in the same direction corresponding to the polarity of the alternating-current signal at the same time, thus not only the vibration amplitude of the vibration film can be made sufficiently large for obtaining the parametric effect, but also the high sound pressure can be generated throughout a wide frequency band because the symmetric property of the vibration is assured.

Further, the through holes provided to the pair of electrodes are made act as resonance tubes, and the electrostatic ultrasonic transducer is driven and controlled so as to shift the mechanical resonance frequency of the vibration film and the acoustic resonance frequency of the through holes from each other. Therefore, it becomes possible to generate a high intensity ultrasonic wave throughout the wide frequency band, thus improving the electro-acoustic energy conversion efficiency.

Further, an electrostatic ultrasonic transducer according to the invention includes a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied. In this case, a modulated wave obtained by modulating a carrier wave in an ultrasonic frequency band with a signal wave in an audible frequency band is applied between the pair of electrodes, the through holes provided to the pair of electrodes act as resonance tubes, and a mechanical resonance frequency of the vibration film and a acoustic resonance frequency of the through holes being shifted from each other.

In the electrostatic ultrasonic transducer according to the invention composed of the above configuration, a plurality of through holes is provided to the first electrode and the second electrode at positions where the first electrode and the second electrode face each other, and the alternating-current signal, which is the drive signal, is applied to the pair of electrodes composed of the first and the second electrodes in the condition in which the direct-current bias voltage is applied to the conductive layer of the vibration film. Therefore, the vibration film held between the pair of electrodes is subjected to the electrostatic attractive force and the electrostatic repulsive force in the same direction corresponding to the polarity of the alternating-current signal at the same time, thus not only the vibration amplitude of the vibration film can be made sufficiently large for obtaining the parametric effect, but also the high sound pressure can be generated throughout a wide frequency band because the symmetric property of the vibration is assured.

Further, the through holes provided to the pair of electrodes are made act as resonance tubes, and the electrostatic ultrasonic transducer is driven and controlled so as to shift the mechanical resonance frequency of the vibration film and the acoustic resonance frequency of the through holes from each other. Therefore, it becomes possible to generate a high intensity ultrasonic wave throughout the wide frequency band, thus improving the electro-acoustic energy conversion efficiency.

Further, an electrostatic ultrasonic transducer according to the invention includes a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied. In this case, a modulated wave obtained by modulating a carrier wave in an ultrasonic frequency band with a signal wave in an audible frequency band is applied between the pair of electrodes, assuming that λ is the wavelength of the carrier wave having a frequency shifted as a predetermined amount of frequency from a resonance frequency, a mechanical resonance point of the vibration film, a thickness t of each of the pair of electrodes is set to one of $(\lambda/4)\cdot n$ and roughly $(\lambda/4)\cdot n$ (where, λ is a wavelength of the carrier wave (ultrasonic wave), n is a positive odd number).

In the electrostatic ultrasonic transducer according to the invention composed of the above configuration, a plurality of through holes is provided to the first electrode and the second electrode at positions where the first electrode and the second electrode face each other, and the alternating-current signal, which is the drive signal, is applied to the pair of electrodes composed of the first and the second electrodes in the condition in which the direct-current bias voltage is applied to the conductive layer of the vibration film. Therefore, the vibration film held between the pair of electrodes is subjected to the electrostatic attractive force and the electrostatic repulsive force in the same direction corresponding to the polarity of the alternating-current signal at the same time, thus not only the vibration amplitude of the vibration film can be made sufficiently large for obtaining the parametric effect, but also the high sound pressure can be generated throughout a wide frequency band because the symmetric property of the vibration is assured.

Further, assuming that λ is the wavelength of the carrier wave having a frequency shifted as a predetermined amount of frequency from the resonance frequency, which is the mechanical resonance frequency of the vibration film, by setting the thickness t of each of the pair of electrodes to $(\lambda/4)\cdot n$ or roughly $(\lambda/4)\cdot n$ (where, λ is the wavelength of the ultrasonic wave, n is a positive odd number), it becomes possible that the thickness sections of the electrodes in the through hole sections of each of the electrodes form the resonance tubes, and the mechanical resonance frequency of the vibration film and the acoustic resonance frequency of the through holes are shifted from each other, thus making the sound pressure around the outlet of the electrode maximum, and a higher intensity ultrasonic wave is generated with the same driving conditions in the Push-Pull-type ultrasonic transducer. In other words, improvement of the electro-acoustic energy conversion efficiency can be achieved in the Push-Pull-type ultrasonic transducer.

Further, an electrostatic ultrasonic transducer according to the invention includes a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied. In this case, a modulated wave obtained by modulating a carrier wave in an ultrasonic frequency band with a signal wave in an audible frequency band is applied between the pair of electrodes, assuming that λ is the wavelength of the carrier wave having a frequency shifted as a predetermined amount of frequency from a resonance frequency, a mechanical resonance point of the vibration film, a thickness t of each of the pair of electrodes is set to $(\lambda/4)\cdot n-\lambda/8 \leqq t \leqq (\lambda/4)\cdot n+\lambda/8$ (where, λ is a wavelength of an ultrasonic wave, n is a positive odd number).

In the electrostatic ultrasonic transducer according to the invention composed of the above configuration, a plurality of through holes is provided to the first electrode and the second electrode at positions where the first electrode and the second electrode face each other, and the alternating-current signal, which is the drive signal, is applied to the pair of electrodes composed of the first and the second electrodes in the condition in which the direct-current bias voltage is applied to the conductive layer of the vibration film. Therefore, the vibration film held between the pair of electrodes is subjected to the electrostatic attractive force and the electrostatic repulsive force in the same direction corresponding to the polarity of the alternating-current signal at the same time, thus not only the vibration amplitude of the vibration film can be made sufficiently large for obtaining the parametric effect, but also the high sound pressure can be generated throughout a wide frequency band because the symmetric property of the vibration is assured.

Further, assuming that λ is the wavelength of the carrier wave having a frequency shifted as a predetermined amount of frequency from the resonance frequency, which is the mechanical resonance frequency of the vibration film, by setting the thickness t of each of the pair of electrodes to $(\lambda/4)\cdot n-\lambda/8 \leqq t \leqq (\lambda/4)\cdot n+\lambda/8$ (where, λ is the wavelength of the ultrasonic wave (the carrier wave), n is a positive odd number), it becomes possible that the mechanical resonance frequency of the vibration film and the acoustic resonance frequency of the through holes are shifted from each other, and the thickness sections of the electrodes in the through hole sections of each of the electrodes form the resonance tubes, thus making the sound pressure around the outlet of the electrode a value close to the substantially maximum value, and a higher intensity ultrasonic wave is generated with the same driving conditions in the Push-Pull-type ultrasonic transducer. In other words, improvement of the electro-acoustic energy conversion efficiency can be achieved in the Push-Pull-type ultrasonic transducer.

Further, an electrostatic ultrasonic transducer according to the invention includes a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied. In this case, a modulated wave obtained by modulating a carrier wave in an ultrasonic frequency band with a signal wave in an audible frequency band is applied between the pair of electrodes, assuming that λ is the wavelength of the carrier wave having a frequency shifted as a predetermined amount of frequency from a resonance frequency, a mechanical resonance point of the vibration film, the thickness t1 of one of the pair of electrodes is set to $(\lambda/4)\cdot n$ or roughly $(\lambda/4)\cdot n$ (where, λ is the wavelength of the ultrasonic wave, n is a positive odd number), and the thickness t2 of the other is set to $(\lambda/4)\cdot m$ or roughly $(\lambda/4)\cdot m$ (where, λ is the wavelength of the ultrasonic wave, m is a positive even number).

In the electrostatic ultrasonic transducer composed of the above configuration, a plurality of through holes is provided to the first electrode and the second electrode at positions where the first electrode and the second electrode face each other, and the alternating-current signal, which is the drive signal, is applied to the pair of electrodes composed of the first and the second electrodes in the condition in which the direct-current bias voltage is applied to the conductive layer of the vibration film. Therefore, the vibration film held between the pair of electrodes is subjected to the electrostatic attractive force and the electrostatic repulsive force in the same direction corresponding to the polarity of the alternating-current signal at the same time, thus not only the vibration amplitude of the vibration film can be made sufficiently large for obtaining the parametric effect, but also the high sound pressure can be generated throughout a wide frequency band because the symmetric property of the vibration is assured.

Further, assuming that λ is the wavelength of the carrier wave having a frequency shifted as a predetermined amount of frequency from the resonance frequency, which is the mechanical resonance frequency of the vibration film, by configuring that the thickness t1 of one of the pair of electrodes is set to $(\lambda/4)\cdot n$ or roughly $(\lambda/4)\cdot n$ (where, λ is the wavelength of the ultrasonic wave, n is a positive odd number), and the thickness t2 of the other is set to $(\lambda/4)\cdot m$ or roughly $(\lambda/4)\cdot m$ (where, λ is the wavelength of the ultrasonic wave, m is a positive even number), it becomes possible that the thickness section of one (front face) of the electrodes required to emit high-sound-pressure sound forms the resonance tube, the mechanical resonance frequency of the vibration film and the acoustic resonance frequency of the through holes are shifted from each other, the sound pressure is made maximum around the outlet of the through holes of the electrode, and in the thickness section in the through hole section of the other (rear face) of the electrodes not required to emit sound, the sound pressure is minimized around the outlet of the through holes.

Therefore, in the Push-Pull-type ultrasonic transducers, it is possible not only to generate a higher intensity ultrasonic wave from one (front face side) of the electrodes with the same drive conditions throughout a wide frequency band, but also to suppress the emission of sound from the other (rear face side) of the electrodes to a small value. In other words, improvement of the electro-acoustic energy conversion efficiency can be achieved in the Push-Pull-type ultrasonic transducer.

Further, an electrostatic ultrasonic transducer according to the invention includes a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied. In this case, a modulated wave obtained by modulating a carrier wave in an ultrasonic frequency band with a signal wave in an audible frequency band is applied between the pair of electrodes, assuming that λ is the wavelength of the carrier wave having a frequency shifted as a predetermined amount of frequency from a resonance frequency, a mechanical resonance point of the vibration film, the thicknesses t1, t2 of the pair of electrodes are respectively set to $(\lambda/4)\cdot n-\lambda/8 \leqq t1 \leqq (\lambda/4)\cdot n+\lambda/8$ (where, λ is the wavelength of the ultrasonic wave, and n is a positive odd number) and $(\lambda/4)\cdot m-\lambda/8 \leqq t2 \leqq (\lambda/4)\cdot m+\lambda/8$ (where, λ is the wavelength of the ultrasonic wave, m is a positive even number, and if m=0, then t2 can only take the value of the right-hand side).

In the electrostatic ultrasonic transducer composed of the above configuration, a plurality of through holes is provided to the first electrode and the second electrode at positions where the first electrode and the second electrode face each other, and the alternating-current signal, which is the drive signal, is applied to the pair of electrodes composed of the first and the second electrodes in the condition in which the direct-current bias voltage is applied to the conductive layer of the vibration film. Therefore, the vibration film held between the pair of electrodes is subjected to the electrostatic attractive force and the electrostatic repulsive force in the same direction corresponding to the polarity of the alternating-current signal at the same time, thus not only the vibration amplitude of the vibration film can be made sufficiently large for obtaining the parametric effect, but also the high sound pressure can be generated throughout a wide frequency band because the symmetric property of the vibration is assured.

Further, assuming that λ is the wavelength of the carrier wave having a frequency shifted as a predetermined amount of frequency from the resonance frequency, which is the mechanical resonance frequency of the vibration film, by configuring that the thicknesses t1, t2 of the pair of electrodes are respectively set to $(\lambda/4)\cdot n-\lambda/8 \leqq t1 \leqq (\lambda/4)\cdot n+\lambda/8$ (where, $\lambda$ is the wavelength of the ultrasonic wave (a carrier wave), and n is a positive odd number) and $(\lambda/4)\cdot m-\lambda/8 \leqq t2 \leqq (\lambda/4)\cdot m+\lambda/8$ (where, $\lambda$ is the wavelength of the ultrasonic wave (a carrier wave), m is a positive even number, and if m=0, then t2 can only take the value of the right-hand side), it becomes possible that the thickness section of one (front face) of the electrodes required to emit high-sound-pressure sound forms the resonance tube, the mechanical resonance frequency of the vibration film and the acoustic resonance frequency of the through holes are shifted from each other, the sound pressure is made maximum around the outlet of the through holes of the electrode, and in the thickness section in the through hole section of the other (rear face) of the electrodes not required to emit sound, the sound pressure is minimized around the outlet of the through holes.

Therefore, in the Push-Pull-type ultrasonic transducers, it is possible not only to generate a higher intensity ultrasonic wave from one (front face side) of the electrodes with the same drive conditions throughout a wide frequency band, but also to suppress the emission of sound from the other (rear face side) of the electrodes to a small value. In other words, improvement of the electro-acoustic energy conversion efficiency can be achieved in the Push-Pull-type ultrasonic transducer.

Further, in the electrostatic ultrasonic transducer according to the invention, the holes provided to the pair of electrodes are through holes formed to have cylindrical shapes.

In the electrostatic ultrasonic transducer according to the invention thus configured, the ultrasonic wave generated by the vibration of the vibration film is emitted via the cylindrical through holes provided to the pair of electrodes. This cylindrical through hole has an advantage that it can most easily be manufactured.

Further, in the electrostatic ultrasonic transducer according to the invention, the holes provided to the pair of electrodes are through holes each formed of at least two or more kinds of sizes of consecutive concentric cylindrical holes with different diameters and depths.

In the electrostatic ultrasonic transducer according to the invention thus configured, the through holes each formed of at least two or more kinds of sizes of consecutive concentric cylindrical holes with different diameters and depths are provided to the pair of electrodes. Therefore, since a part of the electrode parallel to a flange section of each of the concentric cylindrical holes of two or more kinds of sizes and provided to the pair of electrodes is configured to face the conductive layer of the vibration film, parallel capacitors can be formed.

Therefore, since the pull down force acts on a part of the vibration film facing the flange section of each of the holes at the same time it is held up, the vibration amplitude of the vibration film can be enlarged.

Further, in the electrostatic ultrasonic transducer according to the invention, the holes provided to the pair of electrodes are each formed to have a tapered cross section.

In the electrostatic ultrasonic transducer according to the invention thus configured, since through holes each having a tapered cross section are provided to the pair of electrodes, the tapered sections of the electrodes are configured to face the conductive layer of the vibration film, thus the parallel capacitor can be formed.

Therefore, since the pull down force acts on a part of the vibration film facing the tapered section of the electrode at the same time it is held up, the vibration amplitude of the vibration film can be enlarged.

Further, in the electrostatic ultrasonic transducer according to the invention, the holes provided to the pair of electrodes are through holes each having a rectangular cross section.

In the electrostatic ultrasonic transducer according to the invention thus configured, the ultrasonic wave generated by the vibration of the vibration film is emitted via the through holes each having a rectangular cross section and provided to the pair of electrodes. This through hole formed to have a rectangular cross section has an advantage that it can most easily be manufactured.

Further, in the electrostatic ultrasonic transducer according to the invention, the holes provided to the pair of electrodes are through holes each formed of two or more kinds of sizes of holes having rectangular shapes with the same lengths and different widths and depths formed on a common center line in a stacked manner.

In the electrostatic ultrasonic transducer according to the invention thus configured, the through holes each formed of at least two or more kinds of sizes of holes having rectangular shapes with the same lengths and different widths and depths formed on a common center line in a stacked manner are provided to the pair of electrodes. Therefore, since a part of the electrode parallel to a flange section of each of the holes each having two or more kinds of sizes of rectangular shapes and provided to the pair of electrodes is configured to face the conductive layer of the vibration film, parallel capacitors can be formed. Therefore, since the pull down force acts on a part of the vibration film facing the flange section of each of the holes at the same time it is held up, the vibration amplitude of the vibration film can be enlarged.

Further, in the electrostatic ultrasonic transducer according to the invention, the rectangular through holes provided to the pair of electrodes are each formed to have a rectangular planar shape and a tapered cross section.

In the electrostatic ultrasonic transducer according to the invention thus configured, since through holes each having a rectangular planar shape and a tapered cross section are provided to the pair of electrodes, the tapered sections of the electrodes are configured to face the conductive layer of the vibration film, thus the parallel capacitor can be formed. Therefore, since the pull down force acts on a part of the vibration film facing the tapered section of the electrode at the same time it is held up, the vibration amplitude of the vibration film can be enlarged.

Further, in the electrostatic ultrasonic transducer according to the invention, the holes provided to the pair of electrodes each have a larger hole diameter and a shallower depth in the side of the vibration film than in the opposite side of the vibration film.

In the electrostatic ultrasonic transducer according to the invention thus configured, since the holes provided to the pair of electrodes each have a larger hole diameter and a shallower depth in the side of the vibration film than in the opposite side of the vibration film, a part of the electrode parallel to a flange section of each of the concentric cylindrical holes of two or more kinds of sizes is configured to face the conductive layer of the vibration film, thus parallel capacitors can be formed. Therefore, the electrostatic attractive force and the electrostatic repulsive force acting on the conductive layer of the vibration film can be made stronger.

Further, in the electrostatic ultrasonic transducer according to the invention, the rectangular holes provided to the pair of electrodes each have a larger width and a shallower depth in the side of the vibration film than in the opposite side of the vibration film.

In the electrostatic ultrasonic transducer according to the invention thus configured, since the rectangular holes provided to the pair of electrodes each have a larger width and a shallower depth in the side of the vibration film than in the opposite side of the vibration film, a part of the electrode parallel to a flange section of each of the holes having two or more kinds of sizes of rectangular shapes or a tapered section of the electrode is configured to face the conductive layer of the vibration film, thus parallel capacitors can be formed. Therefore, the electrostatic attractive force and the electrostatic repulsive force acting on the conductive layer of the vibration film can be made stronger.

Further, in the electrostatic ultrasonic transducer according to the invention, the plurality of through holes has the same size.

In the electrostatic ultrasonic transducer according to the invention thus configured, the through holes with the same sizes are provided to each of the pair of electrodes. Accordingly, the holes can easily be provided, thus reduction of manufacturing cost can be achieved.

Further, in the electrostatic ultrasonic transducer according to the invention, the plurality of through holes has the same size in each of the positions where the through holes face each other, and includes a plurality of sizes of through holes.

In the electrostatic ultrasonic transducer according to the invention thus configured, the through holes have the same sizes in each of the positions in the pair of electrodes where the through holes face each other, and a plurality of sizes of through holes are formed. Accordingly, the holes can easily be provided, thus reduction of manufacturing cost can be achieved.

Further, in the electrostatic ultrasonic transducer according to the invention, the pair of electrodes are made of a single conductive member.

In the electrostatic ultrasonic transducer according to the invention thus configured, the pair of electrodes can be made of a single conductive member, namely a conductive material such as SUS, brass, iron, and nickel.

Further, in the electrostatic ultrasonic transducer according to the invention, the pair of electrodes is made of a plurality of conductive members.

In the electrostatic ultrasonic transducer according to the invention thus configured, the pair of electrodes can be made of a plurality of conductive members.

Further, in the electrostatic ultrasonic transducer according to the invention, the pair of electrodes is formed of a conductive member and an insulation member.

In the electrostatic ultrasonic transducer according to the invention thus configured, the pair of electrodes can be formed of a conductive member and an insulation member. For example, by performing a process for providing desired holes on the insulation member such as a glass epoxy board or paper phenol board, and then performing a plating process with nickel, gold, silver, copper, and so on, the electrode can be formed of the conductive member and the insulation member. Thus, weight saving of the ultrasonic transducer can be achieved.

Further, in the electrostatic ultrasonic transducer according to the invention, the vibration film is a thin film formed of an insulating polymeric film provided with electrode layers formed on the both surfaces.

In the electrostatic ultrasonic transducer according to the invention thus configured, the vibration film is formed by forming the electrode layers on the both surfaces of the insulating polymeric film. Further, in this case, as described later, the electrode facing the vibration film is provided with an insulation layer. Therefore, it becomes easy to manufacture the vibration film.

Further, in the electrostatic ultrasonic transducer according to the invention, the vibration film is a thin film formed by laminating an electrode layer with a pair of insulating polymeric films.

In the electrostatic ultrasonic transducer according to the invention thus configured, the vibration film is formed by laminating the electrode layer with a pair of insulation layers (insulating polymeric films). Therefore, the insulating process of the electrode becomes unnecessary, thus making the manufacture of the ultrasonic transducer easy. Further, it becomes easy to ensure the symmetric property of the electrode arrangement with respect to the vibration film.

Further, in the electrostatic ultrasonic transducer according to the invention, the vibration film is formed, using a pair of thin films each provided with an electrode layer on one surface of an insulating polymeric film, by adhering the electrode layers with each other.

In the electrostatic ultrasonic transducer according to the invention thus configured, a pair of thin films each provided with an electrode layer on one surface of an insulating polymeric film are used, and the vibration film is formed by adhering the electrode layers with each other. Therefore, it becomes easy to manufacture the vibration film.

Further, in the electrostatic ultrasonic transducer according to the invention, an electret film is used for the vibration film.

In the electrostatic ultrasonic transducer according to the invention thus configured, an electret film is used as the vibration film. In this case, an insulation layer is formed on the side of the electrode. Therefore, it becomes easy to manufacture the vibration film.

Further, in the electrostatic ultrasonic transducer according to the invention, in the case in which the vibration film as the thin film provided with the electrode layers formed on the both surfaces of the insulating polymeric film or the vibration film using the electret film is used, an electric insulation treatment is performed on the vibration film side of each of the pair of electrodes.

In the electrostatic ultrasonic transducer according to the invention thus configured, in the case in which the vibration film provided with the conductive layers (the electrode layers) formed on the both surfaces of the insulation layer (the insulating film) is used as the vibration film, or in the case in which the electret film is used as the vibration film, an electric insulation treatment is performed on the vibration film side of the electrodes. Therefore, it becomes possible to use a double-sided electrode evaporated film provided with the conductive layers (the electrode layers) formed on the both surfaces of the insulation layer (the insulating film) or an electret film as the vibration film.

Further, in the electrostatic ultrasonic transducer according to the invention, a direct-current bias voltage with a single polarity is applied to the vibration film.

In the electrostatic ultrasonic transducer according to the invention thus configured, a direct-current bias voltage with a single polarity is applied to the vibration film. Therefore, since the charge with the same polarity is always accumulated in the electrode layers of the vibration film, the vibration film is subjected to the electrostatic attractive force and the electrostatic repulsive force in accordance with the polarity of the voltage on the electrode varied in accordance with the alternating-current signal applied to the pair of electrodes, and thus vibrates.

Further, in the electrostatic ultrasonic transducer according to the invention, a member for holding the electrodes and the vibration film is formed of an insulating material.

In the electrostatic ultrasonic transducer according to the invention thus configured, a member for holding the electrodes and the vibration film is formed of an insulating material. Therefore, the electric insulation between the electrodes and the vibration film can be maintained.

Further, in the electrostatic ultrasonic transducer according to the invention, the vibration film is fixed while applying tension force in four directions perpendicular to each other on the surface of the film.

In the electrostatic ultrasonic transducer according to the invention thus configured, the vibration film is fixed while applying tension force in four directions perpendicular to each other on the film plane. Therefore, although in the past, it has been required to apply several hundreds of volts of direct-current bias voltage to the vibration film in order for absorbing the vibration film to the electrode, by fixing the film with tension force applied thereto in the manufacturing process of the film unit of the vibration film, the similar action to the action of the pulling tension of which the direct-current bias voltage has been in charge in the past is exerted, thus the direct-current bias voltage can be reduced.

Further, an electrostatic ultrasonic transducer according to the invention includes a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied. Assuming that λ is the wavelength of the carrier wave having a frequency shifted as a predetermined amount of frequency from a resonance frequency, a mechanical resonance point of the vibration film, a thickness t of each of the pair of electrodes is set to (λ/4)·n or roughly (λ/4)·n (where, λ is a wavelength of the ultrasonic wave, n is a positive odd number). In this case, a modulated wave obtained by modulating the carrier wave in an ultrasonic frequency band with a signal wave in an audible frequency band is applied between the pair of electrodes, and a sound reflecting plate is disposed on a rear side of the electrostatic ultrasonic transducer, the sound reflecting plate emitting the ultrasonic wave emitted from each of opening sections on the rear side to a front side of the electrostatic ultrasonic transducer by paths all having the same lengths.

Further, in the electrostatic ultrasonic transducer according to the invention, the sound reflecting plate includes a pair of first reflecting plates located at a central position of the rear side of the ultrasonic transducer in one end, disposed at an angle of 45° with the both sides of the rear side of the ultrasonic transducer with respect to the central position, and having lengths as long as to conform the other ends to the end sections of the ultrasonic transducer, and a pair of second reflecting plates respectively connected to the first reflecting plates in the outward direction of the first reflecting plates having the same length as the first reflecting plate at a right angle with the end section of the first reflecting plates.

In the electrostatic ultrasonic transducer according to the invention thus configured, a plurality of through holes is provided to the first electrode and the second electrode at positions where the first electrode and the second electrode face each other, and the alternating-current signal, which is the drive signal, is applied to the pair of electrodes composed of the first and the second electrodes in the condition in which the direct-current bias voltage is applied to the conductive layer of the vibration film. Therefore, the vibration film held between the pair of electrodes is subjected to the electrostatic attractive force and the electrostatic repulsive force in the same direction corresponding to the polarity of the alternating-current signal at the same time, thus not only the vibration amplitude of the vibration film can be made sufficiently large for obtaining the parametric effect, but also the high sound pressure can be generated throughout a wide frequency band because the symmetric property of the vibration is assured.

Further, assuming that λ is the wavelength of the carrier wave having a frequency shifted as a predetermined amount of frequency from the resonance frequency, which is the mechanical resonance frequency of the vibration film, by setting the thickness t of each of the pair of electrodes to (λ/4)·n or roughly (λ/4)·n (where, λ is the wavelength of the ultrasonic wave, n is a positive odd number), it becomes possible that the thickness sections of the electrodes in the through hole sections of each of the electrodes form the resonance tubes, and the mechanical resonance frequency of the vibration film and the acoustic resonance frequency of the through holes are shifted from each other, thus making the sound pressure around the outlet of the electrode maximum, and a higher intensity ultrasonic wave is generated with the same driving conditions in the Push-Pull-type ultrasonic transducer. In other words, improvement of the electro-acoustic energy conversion efficiency can be achieved in the Push-Pull-type ultrasonic transducer.

Further, by disposing a sound reflecting plate on a rear side of the electrostatic ultrasonic transducer so that the ultrasonic wave emitted from each of opening sections on the rear side is emitted to the front side of the electrostatic ultrasonic transducer by paths all having the same lengths, in other words, by disposing, on a rear side of the electrostatic ultrasonic transducer, the sound reflecting plate composed of a pair of first reflecting plate located at a central position of the rear side of the ultrasonic transducer in one end, disposed at an angle of 45° with the both sides of the rear side of the ultrasonic transducer with respect to the central position, and having lengths as long as to conform the other ends to the end sections of the ultrasonic transducer, and a pair of second reflecting plate respectively connected to the first reflecting plates in the outward direction of the first reflecting plates having the same length as the first reflecting plate at a right angle with the end section of the first reflecting plates, the ultrasonic wave emitted from the rear side of the electrostatic ultrasonic transducer is reflected by the sound reflecting plate to the front side, thus the ultrasonic wave emitted from the front side and rear side of the electrostatic ultrasonic transducer can effectively be utilized.

Further, an electrostatic ultrasonic speaker according to the invention, includes: an electrostatic ultrasonic transducer having a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied, assuming that λ is the wavelength of the carrier wave having a frequency shifted as a predetermined amount of frequency from a resonance frequency, a mechanical resonance point of the vibration film, a thickness t of each of the pair of electrodes being set to (λ/4)·n or roughly (λ/4)·n (where, λ is a wavelength of the ultrasonic wave, n is a positive odd number), between the pair of electrodes, a modulated wave obtained by modulating the carrier wave in an ultrasonic frequency band with a signal wave in an audible frequency band being applied; a signal source for generating the signal wave in the audible frequency band; carrier wave supplying means that generates and outputs the carrier wave in the ultrasonic frequency band; and modulation means that modulates the carrier wave with the signal wave in the audible frequency band output from the signal source, the electrostatic ultrasonic transducer being driven with a modulated signal output from the modulation means and applied between the pair of electrodes and an electrode layer of the vibration film.

In the ultrasonic speaker according to the invention thus configured, the signal wave in the audible frequency band is generated by the signal source, and the carrier wave in the ultrasonic frequency band is generated and output by the carrier wave supply means. Further, the carrier wave is modulated by the modulation means with the signal wave in the audible frequency band output from the signal source, and the modulated signal output from the modulation means is applied between the electrode and the electrode layer of the vibration film, thus the vibration film is driven.

Since the ultrasonic speaker according to the invention is configured using the electrostatic ultrasonic transducer having the above configuration, the ultrasonic speaker capable of generating the acoustic signal with sufficiently high sound pressure for obtaining the parametric array effect throughout a wide frequency band can be realized.

Further, since the ultrasonic speaker according to the invention uses the electrostatic ultrasonic transducer configured so as to shift the mechanical resonance frequency of the vibration film and the acoustic resonance frequency of the through holes from each other, the resonance phenomenon of the film vibration and the resonance principle of the sound wave can be applied, and a high intensity ultrasonic wave can be generated throughout a wide frequency band by shifting the resonance points from each other, thus improvement of sound quality can be achieved.

Further, a method of reproducing an audio signal by an electrostatic ultrasonic transducer according to the invention uses an electrostatic ultrasonic transducer including a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied, assuming that λ is the wavelength of the carrier wave having a frequency shifted as a predetermined amount of frequency from a resonance frequency, a mechanical resonance point of the vibration film, a thickness t of each of the pair of electrodes being set to (λ/4)·n or roughly (λ/4)·n (where, λ is a wavelength of the ultrasonic wave, n is a positive odd number), between the pair of electrodes, a modulated wave obtained by modulating the carrier wave in an ultrasonic frequency band with a signal wave in an audible frequency band being applied, and includes the steps of: a signal source generating the signal wave in the audible frequency band; carrier wave supplying means generating and outputting the carrier wave in the ultrasonic frequency band; modulation means generating modulated signal obtained by modulating the carrier wave with the signal wave in the audible frequency band; and driving the electrostatic ultrasonic transducer by applying the modulated signal between the electrode and the electrode layer of the vibration film.

In the method of reproducing an audio signal by an electrostatic ultrasonic transducer according to the invention including the above steps, the signal wave in the audible frequency band is generated by the signal source, and the carrier wave in the ultrasonic frequency band is generated and output by the carrier wave supply source. Subsequent1y, the carrier wave is modulated by the modulation means with the signal wave in the audible frequency band, and the modulated signal is then applied between the electrode and the electrode layer of the vibration film, thus the electrostatic ultrasonic transducer is driven.

Thus, by using the electrostatic ultrasonic transducer having the above configuration, the amplitude of the film vibration can be enlarged with low voltage applied between the electrodes, and it becomes possible to output the acoustic signal with a sufficiently high sound pressure for obtaining the parametric array effect throughout a wide frequency band to reproduce the audio signal.

Further, since the method of reproducing an audio signal by an electrostatic ultrasonic transducer according to the invention uses the electrostatic ultrasonic transducer configured to shift the mechanical resonance frequency of the vibration film and the acoustic resonance frequency of the through holes from each other, a high intensity ultrasonic wave can be emitted throughout a wide frequency band, thus improvement of the sound quality of the reproduced sound can be achieved.

Further, an ultra-directional acoustic system according to the invention is configured using an electrostatic ultrasonic transducer including a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied, assuming that λ is the wavelength of the carrier wave having a frequency shifted as a predetermined amount of frequency from a resonance frequency, a mechanical resonance point of the vibration film, a thickness t of each of the pair of electrodes being set to (λ/4)·n or roughly (λ/4)·n (where, λ is a wavelength of the ultrasonic wave, n is a positive odd number), a modulated wave obtained by modulating the carrier wave in an ultrasonic frequency band with a signal wave in an audible frequency band being applied between the pair of electrodes, and has an ultrasonic speaker for reproducing audio signal of the middle/high pitch sound in the audio signal supplied from an audio source, and a bass speaker for reproducing audio signal of the low pitch sound in the audio signal supplied from the audio source, thus reproducing the audio signal supplied from the audio source by the ultrasonic speaker to form virtual sound source in the vicinity of an acoustic wave reflecting surface such as a screen.

The ultra-directional acoustic system according to the invention thus configured uses the ultrasonic speaker composed of an electrostatic transducer including a first electrode having a through hole, a second electrode having a through hole making a pair with the through hole of the first electrode, and a vibration film held between a pair of electrodes composed of the first and the second electrodes and having an electrode layer to which a direct-current bias voltage is applied, and holds the pair of electrodes and the vibration film, the alternating-current signal being applied between the pair of electrodes and the electrode layer of the vibration film. The audio signal of the middle/high pitch sound in the audio signal supplied from the audio source is reproduced by the ultrasonic speaker. Further, the audio signal of the low pitch sound in the audio signal supplied from the audio source is reproduced by the bass speaker.

Therefore, the voltage applied between the electrodes of the electrostatic ultrasonic transducer can be lowered, and with sufficient sound pressure and wide frequency characteristic in the improved sound pressure condition, the middle/high pitch sound can be reproduced as if it is emitted from the virtual sound source formed in the vicinity of the acoustic wave reflecting surface such as a screen. Further, since the low pitch sound is directly output from the bass speaker equipped in the audio system, the low pitch sound can be reinforced, thus the acoustic field environment with improved presence can be created.

Further, since the ultra-directional acoustic system according to the invention uses the electrostatic ultrasonic transducer configured to shift the mechanical resonance frequency of the vibration film and the acoustic resonance frequency of the through holes from each other, a high intensity ultrasonic wave can be emitted throughout a wide frequency band, thus improvement of the sound quality of the reproduced sound can be achieved.

Further, a display device according to the invention is configured including an electrostatic ultrasonic transducer having a first electrode having a through hole, a second electrode having a through hole, and a vibration film held between a pair of electrodes composed of the first electrode and the second electrode disposed so that the through hole of the first electrode and the through hole of the second electrode forms a pair, and having a conductive layer to which a direct-current bias voltage is applied, assuming that λ is the wavelength of the carrier wave having a frequency shifted as a predetermined amount of frequency from a resonance frequency, a mechanical resonance point of the vibration film, a thickness t of each of the pair of electrodes being set to (λ/4)·n or roughly (λ/4)·n (where, λ is a wavelength of the ultrasonic wave, n is a positive odd number), a modulated wave obtained by modulating the carrier wave in an ultrasonic frequency band with a signal wave in an audible frequency band being applied between the pair of electrodes, and has an ultrasonic speaker for reproducing signal sound in the audible frequency band in the audio signal supplied from an audio source, and a projection optical system for projecting a video image on a projection surface.

The display device according to the invention thus configured uses the ultrasonic speaker configured including the electrostatic ultrasonic transducer including a first electrode having a through hole, a second electrode having a through hole for forming a pair with the through hole of the first electrode, a vibration film held between a pair of electrodes composed of the first and the second electrodes and having a conductive layer to which a direct-current bias voltage is applied, holding the pair of electrodes and the vibration film, assuming that λ is the wavelength of the carrier wave having a frequency shifted as a predetermined amount of frequency from the resonance frequency, which becomes the mechanical resonance frequency of the vibration film, setting the thickness t of each of the pair of electrodes to (λ/4)·n or roughly (λ/4)·n (where, λ is the wavelength of the ultrasonic wave, n is a positive odd number), and applying an alternating-current signal as the modulated wave by modulating the carrier wave in the ultrasonic frequency band in accordance with the signal wave in the audible frequency band between the pair of electrodes. The audio signal supplied from the audio source is reproduced by the ultrasonic speaker. Thus, the acoustic signals can be reproduced so as to be seen from the virtual sound sources formed in the vicinity of the acoustic wave reflecting surface such as a screen with sufficient sound pressure and a wide frequency characteristic in the improved sound pressure condition. Therefore, it becomes possible to easily control a reproduction range of the acoustic signal. Further, directivity control of the sound emitted from the ultrasonic speaker can be performed.

Further, since the ultra-directional acoustic system according to the invention uses the electrostatic ultrasonic transducer configured to shift the mechanical resonance frequency of the vibration film and the acoustic resonance frequency of the through holes from each other, a high intensity ultrasonic wave can be emitted throughout a wide frequency band, thus improvement of the sound quality of the reproduced sound can be achieved.

PREFERRED EMBODIMENTS

Figure 1A:
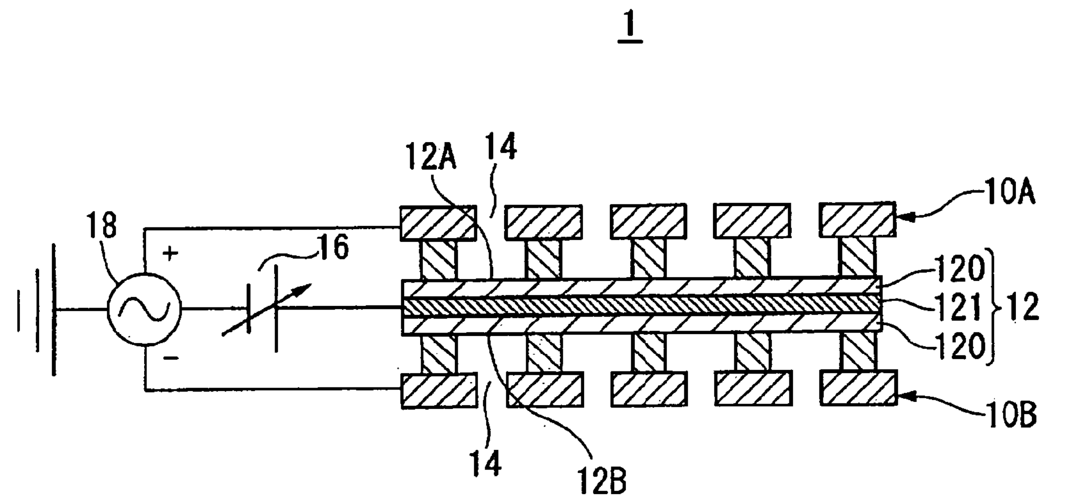
FIG. 1 is a diagram showing a configuration of an ultrasonic transducer according to an embodiment of the invention.
Figure 1B:
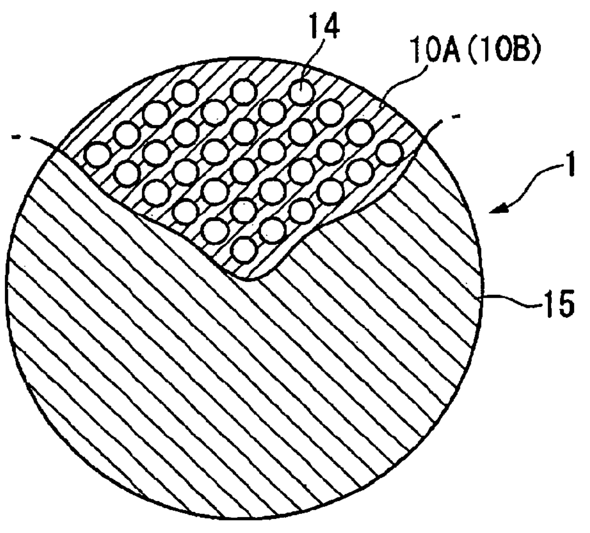

Hereinafter, some embodiments of the invention will be described in detail with reference to the accompanying drawings. FIG. 1 shows a configuration of an electrostatic ultrasonic transducer according to an embodiment of the invention. FIG. 1A shows the configuration of the electrostatic ultrasonic transducer, and FIG. 1B shows a partially sectional plan view of the electrostatic ultrasonic transducer. In FIG. 1, the electrostatic ultrasonic transducer 1 according to the embodiment of the invention has a pair of electrodes 10A (a first electrode) and 10B (a second electrode) including conductive members formed of conductive material and functioning as electrodes, a vibration film 12 sandwiched by the pair of electrodes 10A, 10B and including a conductive layer 121, and a member (not shown) for holding the pair of electrodes 10A, 10B and the vibration film.

The vibration film 12 is formed of an insulation member 120 and has an electrode layer 121 formed of a conductive material. It is arranged that a direct current bias voltage with a single polarity (either the positive polarity or the negative polarity) is applied to the electrode layer 121 by a direct current bias source 16, and further, it is arranged that alternating-current signals 18A, 18B having phases inverted from each other and output from a signal source 18 are applied to the electrodes 10A, 10B between the electrode layer 12 overlapping the direct current bias voltage.

Further, a pair of electrodes 10A, 10B are provided with the same and plural number of through holes 14 at positions opposing to each other across the vibration film 12, and it is arranged that the alternating-current signals 18A, 18B having the phases inverted from each other are applied between the conductive materials of the pair of electrodes 10A, 10B from the signal source 18. Capacitors are formed between the electrode 10A and the electrode layer 121 and between the electrode 10B and the electrode layer 121, respectively.

Further, the thickness t of the electrodes is arranged so that the through holes of one or both of the pair of electrodes 10A, 10B act as resonance tubes as described later, and it is arranged that the electrostatic ultrasonic transducer 1 is driven and controlled so as to shift the mechanical resonance frequency of the vibration film 12 and the acoustic resonance frequency of the through holes 14.

In the electrostatic ultrasonic transducer 1 of the configuration described above, the single polarity (the positive polarity in the present embodiment) direct-current bias voltage is applied to the electrode layer of the vibration film 12 in the condition overlapped with the alternating-current signals 18A, 18B output from the signal source 18.

Meanwhile, the pair of electrodes 10A, 10B are provided with the alternating-current signals 18A, 18B having the phases inverted from each other applied thereto from the signal source 18.

As a result, in the positive half cycle of the alternating-current signal 18A output from the signal source 18, the positive voltage is applied to the electrode 10A, and accordingly, electrostatic repulsive force acts on a front face part 12A which is not held between the electrodes of the vibration film 12, and the front face part 12A is pulled downward in FIG. 1.

Further, at this moment, the alternating-current signal 18B is in the negative cycle to apply a negative voltage to the opposing electrode 10B, and accordingly, electrostatic attractive force acts on a rear face part 12B which is the reverse side of the front face section 12A of the vibration film 12, and the rear face part 12B is further pulled downward in FIG. 1.

Therefore, the electrostatic attractive force and the electrostatic repulsive force act on a part of the film which is not held between the pair of electrodes 10A, 10B of the vibration film 12 in the same directions. The same applies to the negative half cycle of the alternating-current signal output from the signal source 18, and the electrostatic attractive force acts on the front face part 12A of the vibration film 12 in the upward direction in FIG. 1, and the electrostatic repulsive force acts on the back face part 12B in the upward direction in FIG. 1, thus the electrostatic attractive force and the electrostatic repulsive force act on a part of the film which is not held between the pair of electrodes 10A, 10B of the vibration film 12 in the same directions. In this case, the electrostatic ultrasonic transducer 1 is driven and controlled so as to shift the mechanical resonance frequency of the vibration film 12 and the acoustic resonance frequency of the through holes 14. A specific example will be described later. As described above, since the acting direction of the electrostatic force varies alternately while the vibration film 12 is subjected to the electrostatic attractive force and the electrostatic repulsive force in the same directions in accordance with the change in the polarity of the alternating-current signal, not only large film vibration, namely the acoustic signal having a sufficient sound pressure level for obtaining the parametric array effect can be generated, but also the high sound pressure can be generated throughout the wide frequency band because the symmetrical property of vibration is assured.

Further, the electrostatic ultrasonic transducer 1 is arranged to have the thickness of the electrodes so that the through holes 14 provided to the pair of electrodes act as the resonance tubes, and is driven and controlled so as to shift the mechanical resonance frequency of the vibration film 12 and the acoustic resonance frequency of the through holes 14.

Therefore, it becomes possible to generate a high intensity ultrasonic wave throughout the wide frequency band, thus improving the electro-acoustic energy conversion efficiency.

As described above, the ultrasonic transducer 1 according to the embodiment of the invention is called a Push-Pull-type because the vibration film 12 is subjected to the force from the pair of electrodes 10A, 10B and vibrates in accordance therewith.

The ultrasonic transducer 1 according to the embodiment of the invention has potential for fulfilling the wide band property and the high sound pressure compared to the electrostatic ultrasonic transducer (Pull-type) in the related art in which only the electrostatic attractive force acts on the vibration film.

Figure 17:
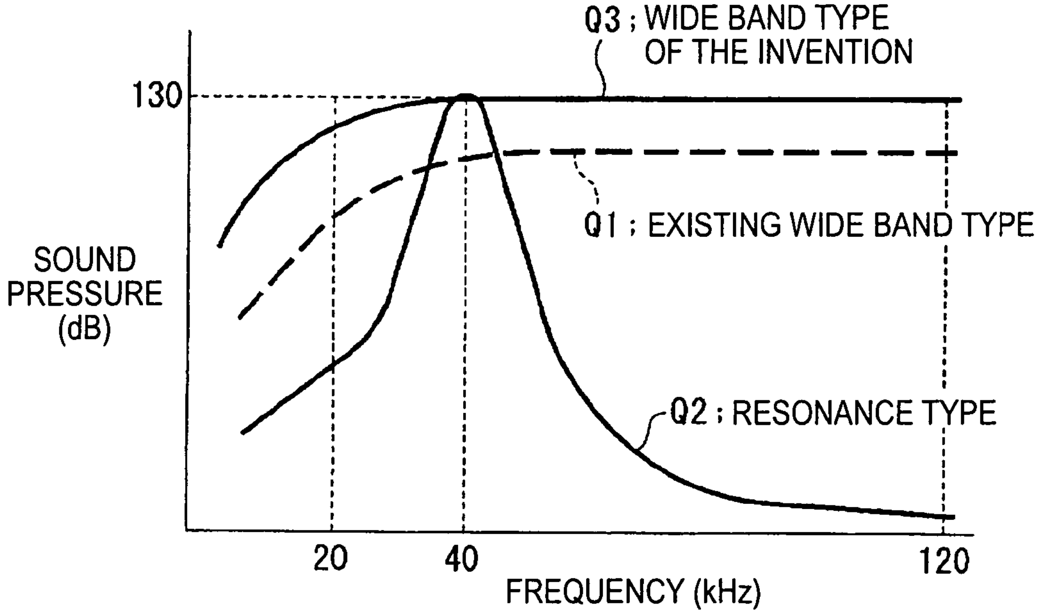
FIG. 17 is a diagram showing a frequency characteristic of the ultrasonic transducer according to the embodiment of the invention together with the frequency characteristic of the ultrasonic transducer of the related art.

FIG. 17 shows the frequency characteristic of the ultrasonic transducer according to an embodiment of the invention. In the drawing, the curve Q3 illustrates the frequency characteristic of the ultrasonic transducer according to the present embodiment of the invention. As apparent from the drawing, it is understood that the high sound pressure can be obtained throughout a wider frequency band compared to the frequency characteristic of the wide band-type of the electrostatic ultrasonic transducer in the related art. Specifically, it is understood that the sound pressure level of no lower than 120 dB, with which the parametric effect can be obtained, can be obtained in the frequency band of 20 kHz through 120 kHz.

Since in the ultrasonic transducer 1 according to the embodiment of the invention, the thin film vibration film 12 held between the pair of electrodes 10A, 10B is subjected to both of the electrostatic attractive force and the electrostatic repulsive force, not only large vibration is generated, but also the high sound pressure can be generated through out the wide frequency band because the symmetrical property of the vibration is assured.

Figure 2:
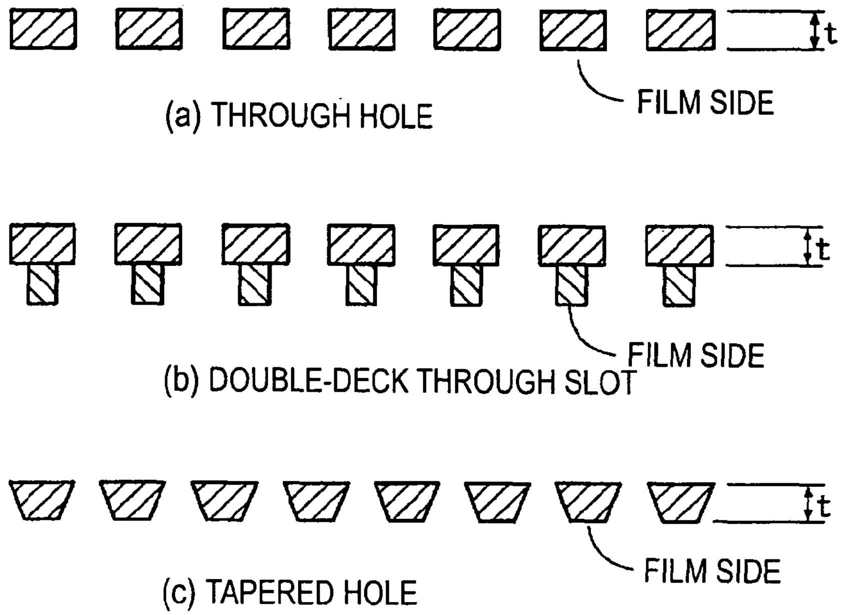
FIG. 2 is an explanatory diagram showing specific examples of the shape of electrodes in the ultrasonic transducer according to the embodiment of the invention.

The electrode of the ultrasonic transducer according to the present embodiment will now be explained. FIG. 2 shows some configuration examples (sectional views) of a cylindrical electrode (either one of the pair of electrodes).

FIG. 2(*a*) shows a through hole type, specifically the holes provided to the pair of electrodes 10A, 10B are through holes formed like cylinders. The electrodes provided with these through holes are the easiest to be manufactured.

FIG. 2(*b*) shows the structure of the electrode having a double-deck through hole structure. Specifically, the holes provided to the pair of electrodes 10A, 10B are through holes each formed of two or more kinds (two kinds in the present embodiment) of sizes of consecutive concentric cylindrical holes with different diameters and depths. The holes provided to the electrodes are each formed to have larger hole diameter and shallower depth in the vibration film side compared to those in the opposite side of the vibration film.

In this case, a section parallel to the flange of each of the holes faces the vibration film 12, and the section forms a parallel-plate capacitor.

Therefore, the flange section of the vibration film 12 is pulled up, and at the same time, the force for pulling it down acts thereon, thus the amplitude of the film vibration can be made larger. Further, FIG. 2(*c*) shows through holes having tapered cross sections. The advantage obtained by adopting this shape as the electrodes is the same as the advantage obtained by the configuration in FIG. 2(*b*).

Figure 3:
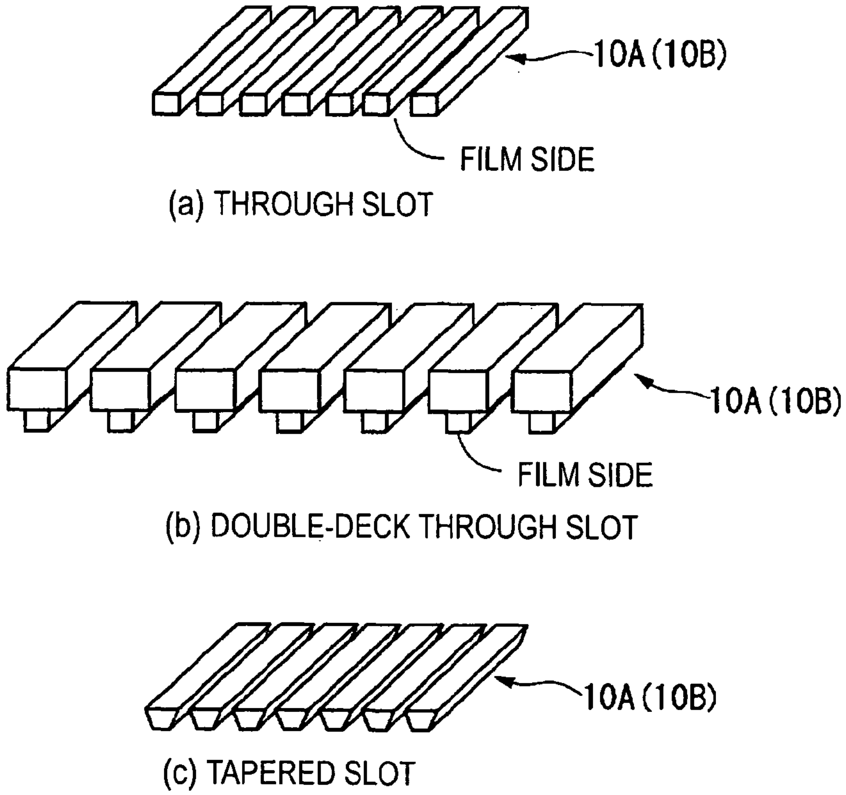
FIG. 3 is an explanatory diagram showing specific examples of a penetrating groove structure of the electrodes in the ultrasonic transducer according to the embodiment of the invention.

FIG. 3 shows some configuration examples (either one of the pair of electrodes) of the electrodes having slot-like through holes. FIG. 3(*a*) shows a through slot type, and the holes provided to the pair of electrodes are each a through hole having a rectangular shape in the plan view and a rectangular shape in the sectional view. The electrodes provided with these through holes are also the easiest to be manufactured.

FIG. 3(*b*) shows the configuration of the electrode having a double-deck through slot structure. Specifically, the holes provided to the pair of electrodes 10A, 10B are through holes each formed of two or more kinds (two kinds in the present embodiment) of sizes of holes having rectangular planar shapes with the same lengths and different widths and depths formed on a common centerline in a stacked manner.

In this case, similarly to the case with the circular shape, a section parallel to a flange section of each of the slots faces the vibration film 12, and this section forms the parallel-plate capacitor.

Therefore, the flange section of the vibration film 12 is pulled up, and at the same time, the force for pulling it down acts thereon, thus the amplitude of the film vibration of the vibration film 12 can be made larger.

Further, FIG. 3(*c*) shows tapered through slots. In other words, the through holes each having a rectangular planar shape and provided to the pair of electrodes 10A, 10B are each formed to have a tapered cross section. The advantage of the case of adopting this shape as the electrodes is the same as the advantage obtained by the electrodes having the configuration in FIG. 3(*b*).

It should be noted that in the configuration examples in FIGS. 3(*b*) and 3(*c*), the rectangular holes provided to the electrodes are each formed to have larger width and shallower depth in the vibration film side compared to those in the opposite side of the vibration film.

Further, the plurality of through holes provided to the electrodes shown in FIGS. 2 and 3 can be made to have the same size.

Further, the plurality of through holes can be made to have a variety of hole sizes providing the sizes are equal in each of the facing pairs.

The electrodes forming the ultrasonic transducer according to the present embodiment can be formed of a single conductive member, or composed of a plurality of conductive members.

Further, the electrodes forming the ultrasonic transducer according to the present embodiment can be composed of a conductive member and an insulation member.

Specifically, it is sufficient for the material of the electrodes of the ultrasonic transducer according to the present embodiment to have conductivity, and the configuration with a single material such as SUS, brass, iron, or nickel is also possible. Further, since weight saving is required, it is also possible that a desired hole providing process is executed on a glass epoxy board or a paper phenolic board typically used in circuit boards, and then a plating process is performed thereon with nickel, gold, silver, or copper. Further, in this case, such a device as to perform the plating process on both sides of the board is effective for preventing warp caused by the forming process.

It should be noted that in the case in which a double-sided electrode evaporated film or an electret film is used as the vibration film 12, some sort of insulation process is requited to be executed on the vibration film 12 side of the pair of electrodes 10A, 10B in the ultrasonic transducer 1 shown in FIG. 1. For example, it is required to perform an insulation process thereon with alumina, a silicon polymeric material, an amorphous carbon film, $SiO_2$, or the like.

Then, the vibration film 12 will now be explained. The function of the vibration film 12 is to keep the charge of the same polarity accumulated therein (whether it is the positive polarity or the negative polarity is neglectful) and to vibrate by the electrostatic force between the electrodes 10A, 10B varied in accordance with the alternating-current voltage. A specific configuration example of the vibration film 12 in the ultrasonic transducer according to the embodiment of the invention will be explained with reference to FIG. 4.

Figure 4:
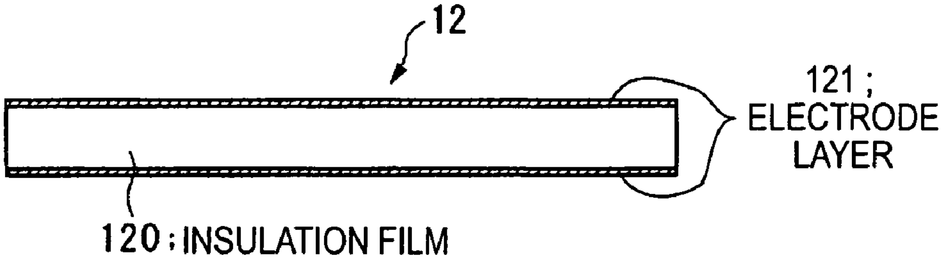
FIG. 4 is an explanatory diagram showing specific examples of the structure of a vibration film in the ultrasonic transducer according to the embodiment of the invention.
Figure 4:
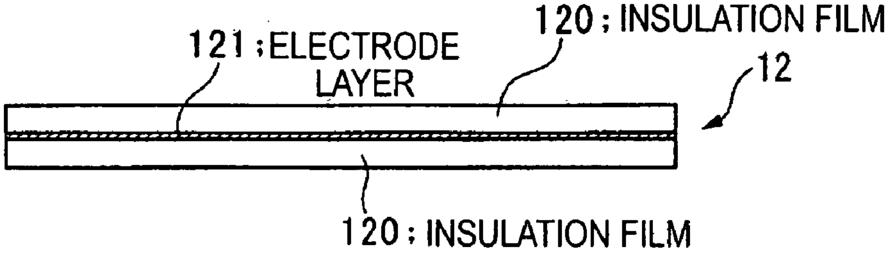
Figure 4:
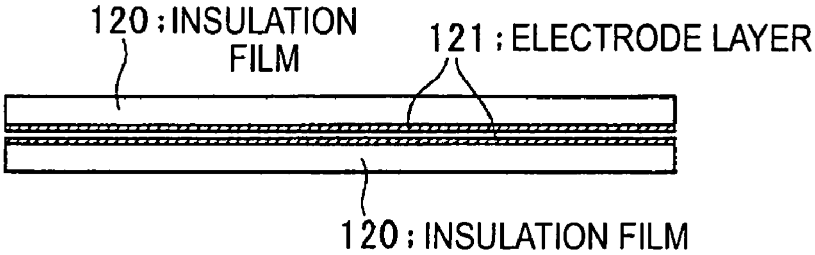

FIG. 4(*a*) shows a sectional configuration of the vibration film 12 provided with the electrode layer 121 by performing an electrode evaporation process on the both sides of the insulation film 120. As the material for the insulation film 120 at the core thereof, a polymeric material such as polyethylene terephthalate (PET), polyester, polyethylene naphthalate (PEN), or polyphenylene sulfide (PPS) is preferable in view of elasticity and withstand voltages.

The most typical electrode evaporation material for forming the electrode layer 121 is Al, and besides that, Ni, Cu, SUS, Ti and so on are preferable in view of chemistry with the polymeric materials described above and the cost. The optimum value of the thickness of the insulation polymeric film as the insulation film 120 for forming the vibration film 12 varies in accordance with the drive frequency, the hole size of the holes provided to the electrodes, and cannot uniquely be decided, but is though to be roughly sufficient typically in a range of no smaller than 1 μm and no greater than 100 μm.

The thickness of the electrode evaporation layer as the electrode layer 121 is also preferably in a range of 40 nm through 200 nm. If the electrode thickness is too thin, the charge can hardly be accumulated. If it is too thick, the film becomes harder which leads to the problem of smaller amplitude. Further, as the electrode material, a transparent conductive film ITO/In, Sn, Zn oxide, and so on can be adopted.

FIG. 4(*b*) shows a structure in which the electrode layer 121 is held between the insulating polymeric films as the insulation film 120. In this case, the thickness of the electrode layer 121 is also preferably in a range of 40 nm through 200 nm similarly to the case shown in FIG. 4(*a*). Further, the electrode layer 121, the material and the thickness of the insulation film 120 for holding the electrode layer 121 therebetween are also preferably the same as the double-sided electrode evaporated film shown in FIG. 4(*a*), namely polyethylene terephthalate (PET), polyester, polyethylene naphthalate (PEN), or polyphenylene sulfide (PPS), in a range of no smaller than 1 μm and no greater than 100 μm.

FIG. 4(*c*) shows what is formed by bonding two single-sided electrode evaporation film with each other so that the electrode faces are contacted to each other. The conditions of the insulation film and the electrode section are preferably the same as the conditions of the other vibration film described above. Further, although the direct-current bias voltage of several hundreds of volts is required for the vibration film 12, the bias voltage can be reduced by fixing the vibration film 12 with tension force applied in four directions perpendicular to each other on the surface of the vibration film 12 in the manufacturing process of a film unit.

This is for exerting the similar action as the pulling tension of which the bias voltage has been in charge in the past by previously applying the tension to the film, and is quite effective measure for voltage reduction.

Also in this case, Al is the most typical film electrode material, and besides that, Ni, Cu, SUS, Ti and so on are preferable in view of chemistry with the polymeric materials described above and the cost. Further, the transparent conductive film ITO/In, Sn, Zn oxide and so on can also be adopted.

Further, as for the electrodes described above or the fixing material for the vibration film, plastic material such as acryl, bakelite, or polyacetal (polyoxymethylene) resin (POM) is preferable in the view point of lightweight and nonconducting.

Then, the configuration of a substantial part of the electrostatic ultrasonic transducer according to the embodiment of the invention will now be explained. Although the structure of the electrode has already been explained with reference to FIGS. 2 and 3, the length t thereof is arranged so that the thickness section of either one or both of the pair of electrodes 10A, 10B according to the embodiment of the invention forms the resonance tubes which are acoustic tubes for causing the resonance phenomenon (see FIG. 2).

Figure 5:
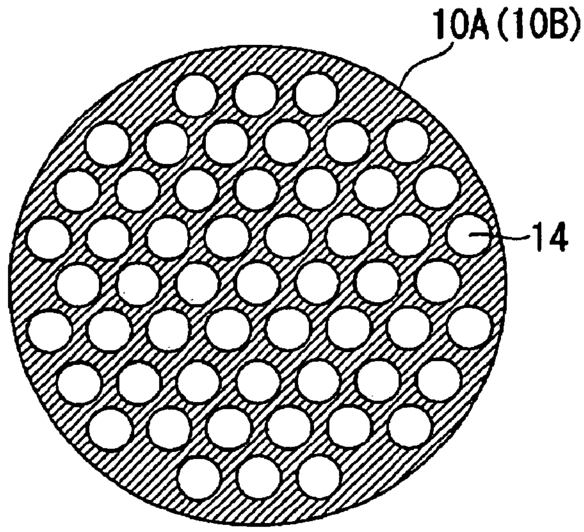
FIG. 5 is a plan view showing the configuration of the electrodes provided with through holes in the ultrasonic transducer according to the embodiment of the invention.

FIG. 5 is a plan view of the electrode (a resonance tube unit) 10A (10B) provided with through holes (resonance tubes) 14, and shows an example of the layout of the through holes provided to the electrode 10A (10B). The layout of the through holes is not necessarily a regular arrangement as shown in FIG. 5.

Further, the length t of the thickness section of the electrode is structurally dominant to the length of the through holes, and accordingly, in order for using the through hole sections of the electrode as the resonance tubes, it is necessary for the length t of the thickness section of the electrode to be determined so as to form the resonance tubes.

Figure 6A:
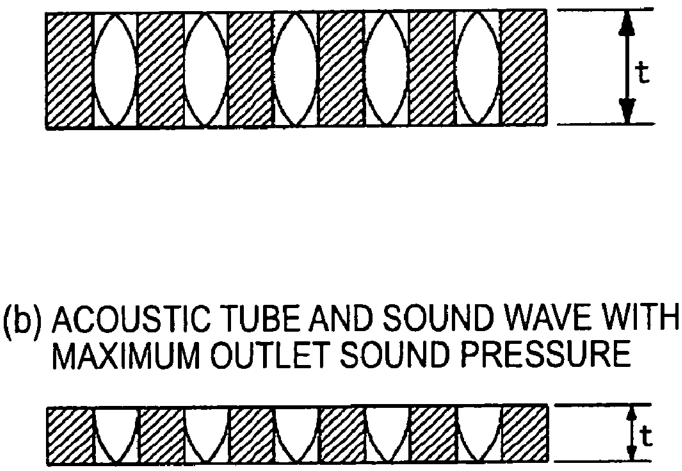
FIG. 6 is a front sectional view showing a resonant state of sound in the electrodes as resonance tube units, the aggregate of resonance tubes.

FIG. 6 is a front sectional view showing a resonant state of sound in the electrode as resonance tube units, the aggregate of resonance tubes. In the drawing, t is the length of the resonance tube, and in the present example, the state of propagation of a half-wavelength acoustic wave is illustrated.

The minimum wavelength unit for causing the resonance phenomenon is half-wavelength, and the theoretical formula for the resonance phenomenon with both ends open is as follows. Assuming that f is the ultrasonic frequency, c is the sonic speed (about 340 m/s), and λ is the wavelength, the relationship can be expressed as follows.

$$\lambda = mc/f \qquad (1)$$

(where, m is an integer).

Here, assuming that the optimum acoustic tube length is λopt, n is an odd natural number, the optimum acoustic tube length can be represented as follows.

$$\lambda\text{opt} = nc/4f \qquad (2)$$

When the wavelength λ of the acoustic wave satisfies the formula (2), the sound pressure becomes maximum at the outlet of the acoustic tube, and this is the acoustic tube (resonance tube) length to be obtained, namely the length t of the thickness section of the electrode. Therefore, FIG. 6(*b*) shows the resonance tube unit, namely the form for making the electrode the most compact, and t in the drawing can take any value providing it is the quarter-wavelength multiplied by a natural number.

In one embodiment (the first embodiment) of the invention, assuming, for example, that λ is the wavelength of the carrier wave having a frequency shifted as a predetermined amount of frequency from the resonance frequency, which becomes the mechanical resonance frequency of the vibration film 12 in the electrostatic ultrasonic transducer 1, it is configured that the thickness t of each of the pair of electrodes 10A, 10B becomes (λ/4)·n or roughly (λ/4)·n (where, λ is the wavelength of the ultrasonic wave, n is a positive odd number).

In the electrostatic ultrasonic transducer according to the invention composed of the above configuration, the plurality of through holes 14 is provided to the first electrode 10A and the second electrode 10B at positions where the first electrode 10A and the second electrode 10B face each other, and the alternating-current signal, which is the drive signal, is applied to the pair of electrodes composed of the first and the second electrodes 10A, 10B in the condition in which the direct-current bias voltage is applied to the conductive layer 121 of the vibration film 12. Therefore, the vibration film 12 held between the pair of electrodes 10A, 10B is subjected to the electrostatic attractive force and the electrostatic repulsive force in the same direction corresponding to the polarity of the alternating-current signal at the same time, thus not only the vibration amplitude of the vibration film 12 can be made sufficiently large for obtaining the parametric effect, but also the high sound pressure can be generated throughout the wide frequency band because the symmetric property of the vibration is assured.

Further, assuming that λ is the wavelength of the carrier wave (an ultrasonic wave) having a frequency shifted as a predetermined amount of frequency from the resonance frequency, which is the mechanical resonance frequency of the vibration film 12, by setting the thickness t of each of the pair of electrodes to (λ/4)·n or roughly (λ/4)·n (where, λ is the wavelength of the ultrasonic wave, n is a positive odd number), it becomes possible that the thickness sections of the electrodes in the through hole sections of each of the electrodes form the resonance tubes, and the mechanical resonance frequency of the vibration film 12 and the acoustic resonance frequency of through holes 14 are shifted from each other, thus making the sound pressure around the outlet of the electrode maximum, and a higher intensity ultrasonic wave is generated with the same driving conditions in the Push-Pull-type ultrasonic transducer. In other words, improvement of the electro-acoustic energy conversion efficiency can be achieved in the Push-Pull-type ultrasonic transducer.

Showing an example of the thickness of the electrode for making it function as the resonance tubes, since the wavelength is 8.5 mm in the case with the frequency of the ultrasonic wave of 40 kHz, the resonance tube length (electrode thickness) t of 2.125 mm, which is a quarter thereof, is sufficient. Since what is emitted is an ultrasonic wave, the wavelength is 17 mm taking the frequency of 20 kHz as the standard. Therefore, the resonance tube length (electrode thickness) t of 4.25 mm, which is a quarter thereof, is sufficient.

Further, the wavelength is 3.4 mm taking the frequency of 100 Hz as the standard. Therefore, the resonance tube length (electrode thickness) t of 0.85 mm, which is a quarter thereof, is sufficient.

Figure 7A:
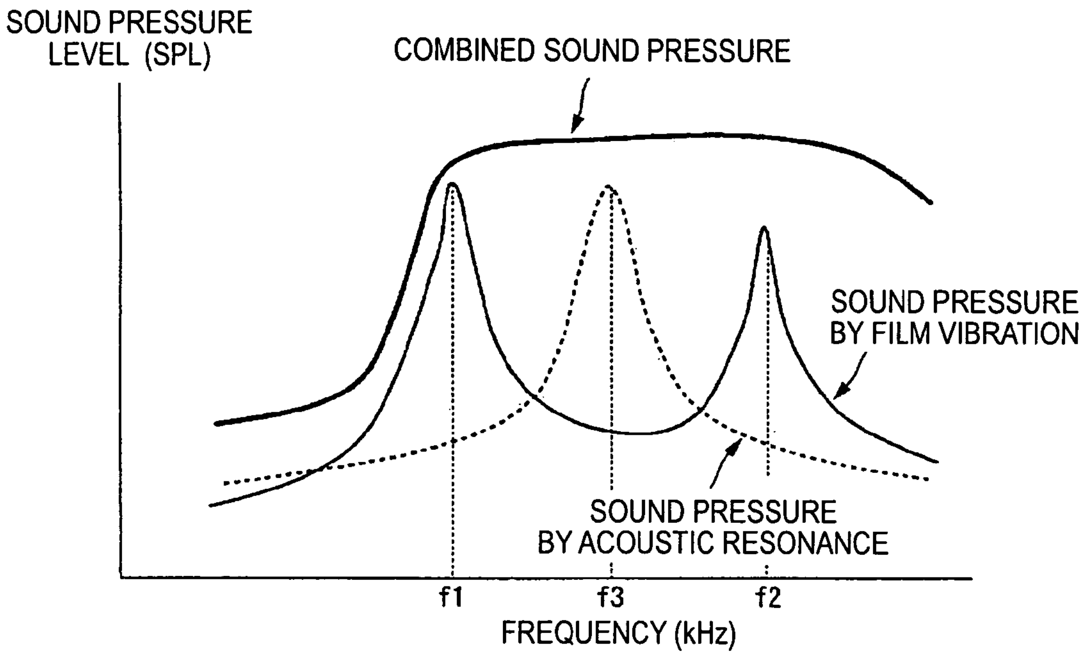
FIG. 7 is a characteristic diagram showing a relationship between each of the sound pressure caused by the mechanical resonance of the vibration film, the sound pressure caused by the acoustic resonance, and the composite sound pressure (the final output sound pressure) thereof and frequency.
Figure 7B:
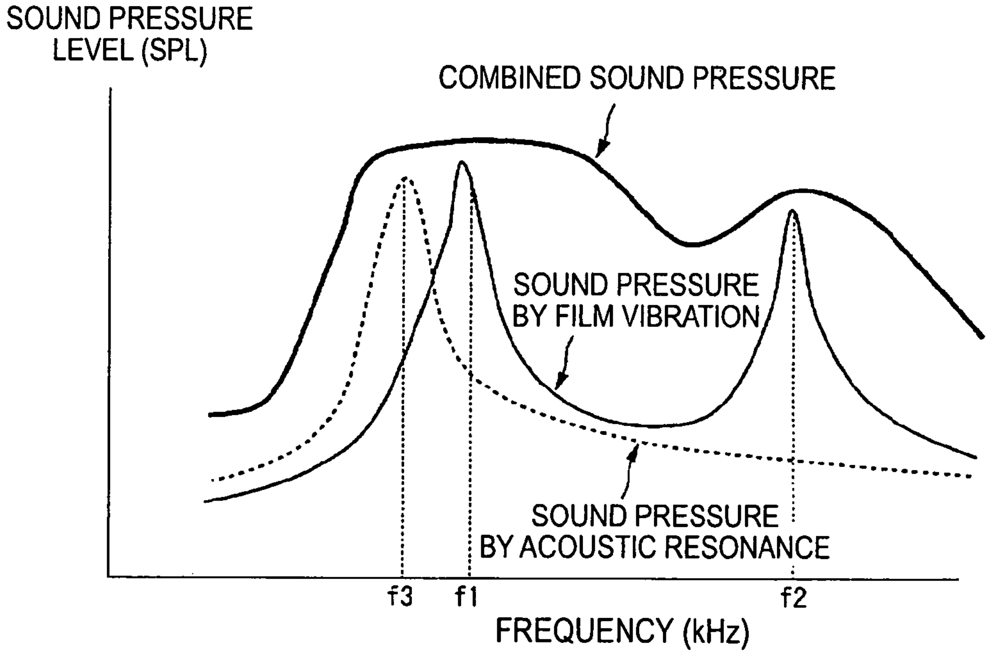

Then, FIG. 7 shows a relationship between each of the sound pressure caused by the mechanical resonance of the vibration film, the sound pressure caused by the acoustic resonance, and the composite sound pressure (the final output sound pressure) thereof and frequency. FIG. 7A shows the case in which the acoustic resonance frequency of the through holes is arranged to fall within the range between the primary resonance frequency and the secondary resonance frequency of the mechanical vibration of the vibration film, and FIG. 7B shows the case in which the acoustic resonance frequency of the through holes is arranged to come short of the primary resonance frequency.

In the case in which the vibration film has a diameter of 1500 μm, a thickness of 12 μm, an acoustic tube diameter of 750 μm, and a length of 1.5 μm, for example, the mechanical resonance frequency (the primary resonance frequency) f1 of the vibration film becomes around 30 kHz. Although FIG. 7A shows the example in which the acoustic resonance frequency f3 of the through holes is designed to come to the middle of the primary resonance frequency f1 and the secondary resonance frequency f2 of the mechanical vibration of the vibration film, other than designing the acoustic resonance frequency f3 of the through holes so as to come to the middle of the primary resonance frequency f1 and the secondary resonance frequency f2 of the mechanical vibration of the vibration film, higher frequency band can be achieved by designing the acoustic resonance frequency of the through holes so as to come short of the primary resonance frequency f1 of the mechanical vibration of the vibration film as shown in FIG. 7B.

Further, in order for making the through holes of the electrodes function as the resonance tubes, in reality, as shown in the following formula (3), it is recommendable to allow a certain level of room in choosing the value of the length t of the thickness section of the electrode.

$$(\lambda/4)\cdot n-\lambda/8 \leqq t \leqq (\lambda/4)\cdot n+\lambda/8 \quad (3)$$

where, λ is the wavelength (Hz) of the ultrasonic wave, n is a positive odd number.

Further, $$\lambda=c/f \quad (4)$$

where, c is the sonic speed, c=331.3+0.6T (m/s) (where, T is air temperature (° C.), and f is the frequency (Hz) of the ultrasonic wave.

What is meant by the formula (3) is that the resonance tube length (the electrode thickness) is selected within the range of an eighth wavelength anterior and posterior (±) to the optimum value of the resonance tube length. The eighth wavelength corresponds to about 70% of the optimum value, which is a limit value equal to or more than which selection of the value is presumed to cause no substantial loss of efficiency.

Figures 8, 9:
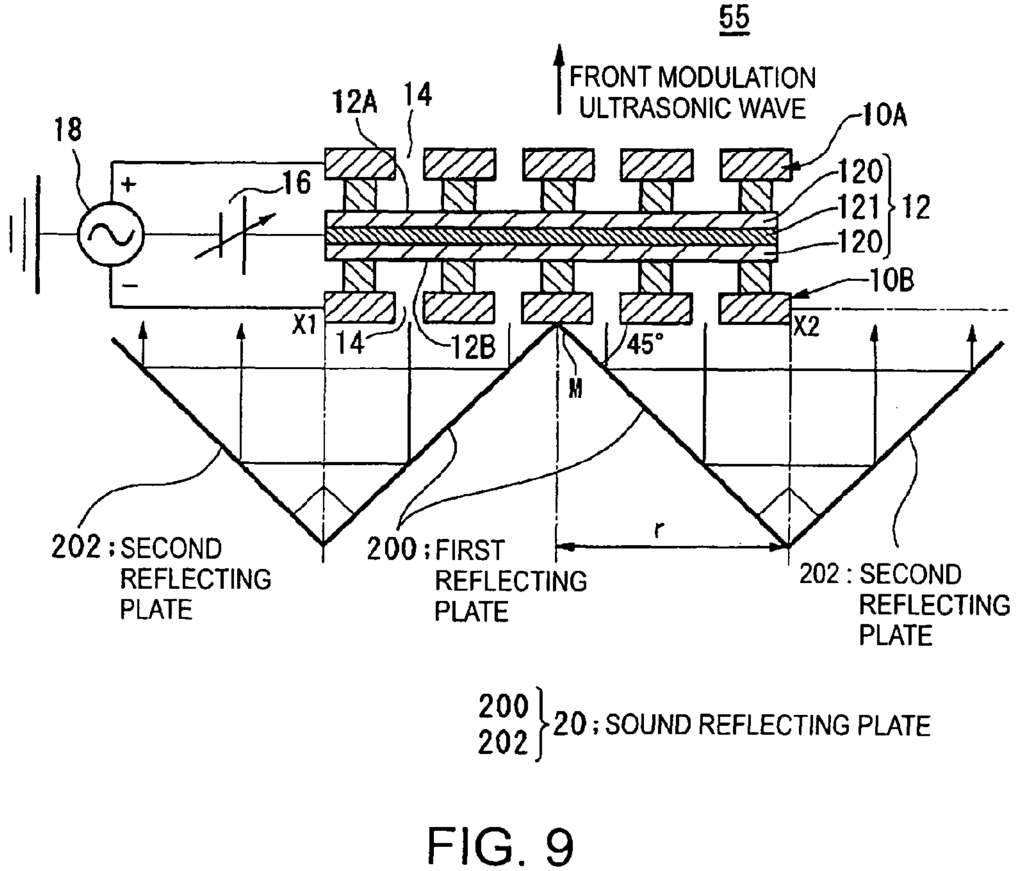
FIG. 8 is an explanatory diagram showing specific examples of a relationship among the primary resonance frequency of mechanical vibration of the vibration film, the wavelength λ of a carrier wave (ultrasonic frequency band), and the acoustic tube length.
FIG. 9 is a diagram showing a configuration of an ultrasonic transducer according to another embodiment of the invention.

FIG. 8 shows specific examples of a relationship among the primary resonance frequency of mechanical vibration of the vibration film, the wavelength λ of a carrier wave (ultrasonic frequency band), and the acoustic tube length. As for the primary resonance frequency of the mechanical vibration of the vibration film in the present drawing, the parameters (e.g., a film diameter, a film material, a film thickness, and so on) defining the vibration film are determined, thus the resonance point of the mechanical vibration of the vibration film, namely the resonance frequency (the first resonance frequency in this example) is determined. Subsequently, assuming that the wavelength of the carrier wave with the frequency shifted as a predetermined amount of frequency (10 kHz in the present embodiment) from this resonance frequency is λ, the frequency f of the carrier wave (an ultrasonic wave) is determined from λ=c/f (where, c is the sonic speed) (formula (4)).

Further, the acoustic tube length (the thickness of the electrode) is determined from the formula (3). The numeral examples thus obtained are the contents of FIG. 8.

It should be noted that in the present embodiment, in FIG. 1, a slight gap is actually provided between the bottom section of the electrode (resonance tube unit) 10A and the vibration film (although in the drawing, they are in a adhered state without a gap). This gap is an open-end correction, and in general, a gap of 0.6 through 0.85 multiplied by the radius of the resonance tube is required.

Further, in order to apply the present principle, it is premised that the inside diameter of the resonance tube is sufficiently smaller than the acoustic wave length, and a plane wave is generated inside the tube. In the case of the electrostatic ultrasonic transducer according to the embodiment of the invention, the generated ultrasonic wave is a plane wave, and the inside diameter of the tube is less than or comparable to about 2.1 mm, which is sufficiently small value with respect to the wavelength of 17 mm when the frequency of the ultrasonic wave generated as the carrier wave is 20 kHz, and accordingly, it can be thought that there is no problem at all.

Then, a second specific example of the electrostatic ultrasonic transducer according to the embodiment of the invention will now be explained. In the specific example, assuming that λ is the wavelength of the carrier wave having a frequency shifted as a predetermined amount of frequency from the resonance frequency, which is the mechanical resonance frequency of the vibration film, it is configured that the thickness t1 of one of the pair of electrodes 10A, 10B in the electrostatic ultrasonic transducer 1 shown in FIG. 1 is set to (λ/4)·n or roughly (λ/4)·n (where, λ is the wavelength of the ultrasonic wave, n is a positive odd number), and the thickness t2 of the other is set to (λ/4)·m or roughly (λ/4)·m (where, λ is the wavelength of the ultrasonic wave, m is a positive even number).

In the electrostatic ultrasonic transducer composed of the above configuration, the plurality of holes 14 is provided to the first electrode 10A and the second electrode 10B at positions where the first electrode 10A and the second electrode 10B face each other, and the alternating-current signal, which is the drive signal, is applied to the pair of electrodes 10A, 10B composed of the first and the second electrodes 10A, 10B in the condition in which the direct-current bias voltage is applied to the conductive layer 121 of the vibration film 12. Therefore, the vibration film 12 held between the pair of electrodes 10A, 10B is subjected to the electrostatic attractive force and the electrostatic repulsive force in the same direction corresponding to the polarity of the alternating-current signal at the same time, thus not only the vibration amplitude of the vibration film 12 can be made sufficiently large for obtaining the parametric effect, but also the high sound pressure can be generated throughout the wide frequency band because the symmetric property of the vibration is assured.

Further, assuming that λ is the wavelength of the carrier wave having a frequency shifted as a predetermined amount of frequency from the resonance frequency, which is the mechanical resonance frequency of the vibration film 12, by configuring that the thickness t1 of one of the pair of electrodes is set to (λ/4)·n or roughly (λ/4)·n (where, λ is the wavelength of the ultrasonic wave, n is a positive odd number), and the thickness t2 of the other is set to (λ/4)·m or roughly (λ/4)·m (where, λ is the wavelength of the ultrasonic wave, m is a positive even number), it becomes possible that the thickness section in the through hole section of one (front face) of the electrodes required to emit high-sound-pressure sound forms the resonance tube, the mechanical resonance frequency of the vibration film and the acoustic resonance frequency of the through holes are shifted from each other, the sound pressure is made maximum around the outlet of the through holes of the electrode, and in the thickness section in the through hole section of the other (rear face) of the electrodes not required to emit sound, the sound pressure is minimized around the outlet of the through holes.

Therefore, in the Push-Pull-type ultrasonic transducers, it is possible not only to generate a higher intensity ultrasonic wave from one (front face side) of the electrodes with the same drive conditions throughout a wide frequency band but also to suppress the emission of sound from the other (rear face side) of the electrodes to a small value. In other words, improvement of the electro-acoustic energy conversion efficiency can be achieved in the Push-Pull-type ultrasonic transducer.

It should be noted that also in the second specific example, it is possible that, assuming that λ is the wavelength of the carrier wave with a frequency shifted as a predetermined amount of frequency from the resonance frequency, which is the mechanical resonance frequency of the vibration film, the thicknesses t1, t2 of the pair of electrodes are respectively set to (λ/4)·n−λ/8≦t1≦(λ/4)·n+λ/8 (where, λ is the wavelength of the ultrasonic wave, and n is a positive odd number), and to (λ/4)·m−λ/8≦t2≦(λ/4)·m+/8 (where, λ is the wavelength of the ultrasonic wave, m is a positive even number, and if m=0, then t2 can only take the value of the right-hand side), thereby allowing spaces for choosing the values of the thicknesses t1, t2 of the electrodes. Also in this case, the same advantages can be obtained.

As described above, according to the electrostatic ultrasonic transducer according to the embodiment of the invention, by utilizing the resonance phenomenon of sound, setting the length of the thickness section of the electrode in the Push-Pull-type electrostatic ultrasonic transducer so that the through holes in the electrode function as the resonance tubes, and shifting the mechanical resonance frequency of the vibration film and the acoustic resonance frequency of the through holes from each other, it becomes possible to generate a higher intensity ultrasonic wave with the same drive conditions. In other words, in the Push-Pull-type electrostatic ultrasonic transducer, the same level of sound pressure can be generated with less electric energy than ever, which can achieve a lower drive voltage (lower power consumption).

Now, a configuration of an ultrasonic transducer according to another embodiment of the invention will be shown in FIG. 9. The configuration of the ultrasonic transducer 55 according to the second embodiment of the invention is the same as the configuration shown in FIG. 1 except that a sound reflecting plate is disposed on the rear face of the ultrasonic transducer. Specifically, the ultrasonic transducer 55 according to the present embodiment is a ultrasonic transducer provided with a pair of electrodes 10A, 10B each including conductive member formed of a conductive material which functions as an electrode, a vibration film 12 held between the pair of electrodes 10A, 10B, and including the conductive layer 121 to which a direct-current bias voltage is applied, and a member (not shown) for holding the pair of electrodes 10A, 10B, and the vibration film 12, the pair of electrodes 10A, 10B having the same and plural number of holes at positions opposing across the vibration film 12, and a alternating-current signal being applied between the conductive members of the pair of electrodes 10A, 10B, and is characterized in that the sound reflecting plate 20 is disposed on the rear face of the ultrasonic transducer. It is the same as the previous embodiment that the lengths t of the thickness sections of the through holes in the pair of electrodes 10A, 10B are made equal, and are set so that the through holes function as the resonance tubes as described above.

The sound reflecting plate 20 is disposed so that the ultrasonic waves emitted from the opening sections on the rear face of the ultrasonic transducer 55 are emitted to the front of the ultrasonic transducer 55 by the paths all having the same lengths.

Specifically, the sound reflecting plate 20 includes a pair of first reflecting plates 200, 200 located at the central position M of the rear face of the ultrasonic transducer 55 in one end thereof, disposed at an angle of 45° with the both sides of the rear face of the ultrasonic transducer 55 with respect to the central position, and having lengths as long as to conform the other ends to the end sections X1, X2 of the ultrasonic transducer 55, and a pair of second reflecting plates respectively connected to the first reflecting plates in the outward direction of the first reflecting plates having the same length as the first reflecting plate at a right angle with the end section of the first reflecting plates 200, 200.

In the above configurations, the length is required enough for disposing the first reflecting plates 200, 200 to the both sides of the center M of the rear face of the ultrasonic transducer 55 at an angle of 45° therewith and for reaching the point where the ends thereof are conformed to the ends of the ultrasonic transducer 55. By the first reflecting plates 200, 200, the ultrasonic waves emitted from the rear face of the ultrasonic transducer 55 are reflected in the horizontal direction.

Subsequently, by respectively connecting the second reflecting plates 202, 202 connected to the first reflecting plates 200, 200 at right angles therewith in the outside of the first reflecting plates 200, 200, the ultrasonic waves are emitted to the front from the sides or upside and downside of the ultrasonic transducer 55. It is necessary for the length of the second reflecting plate to be equal to the length of the first reflecting plate. What is important here is that all of the ultrasonic waves emitted from the rear face of the ultrasonic transducer 55 have the paths with the same lengths. The fact that the paths have the same lengths means that the phases of the ultrasonic waves emitted from the rear face are all aligned.

Further, the reason why the acoustic waves can be treated geometrically as shown in FIG. 9 is that the emitted acoustic waves are ultrasonic waves, and accordingly, have strong directivity. Further, another point necessary to be mentioned here is the time lag between the ultrasonic waves emitted from the front face of the ultrasonic transducer 55 and the ultrasonic waves reflected from the rear face and emitted to the front.

Assuming that the transducer has a circular shape with a radius of r, the distance the ultrasonic wave emitted from a position distant as much as a from the center of the transducer travels to the front face of the transducer is about 2r, which is equal to the diameter of the transducer. Obviously, the distance a must satisfy the following formula.

$$0 \leqq a \leqq r \tag{5}$$

In this case, assuming that the diameter of the transducer is 10 cm and the sonic speed is 340 m/s, the time lag between the ultrasonic wave emitted from the front face and when the ultrasonic wave emitted from the rear face reaches the front after reflected is about 0.29 ms, which is not a sensible time lag, and accordingly no problem arises. Thus, the ultrasonic waves emitted from the front face or the rear face can efficiently be used.

Configuration Example of Ultrasonic Speaker According to the Invention

Figure 10:
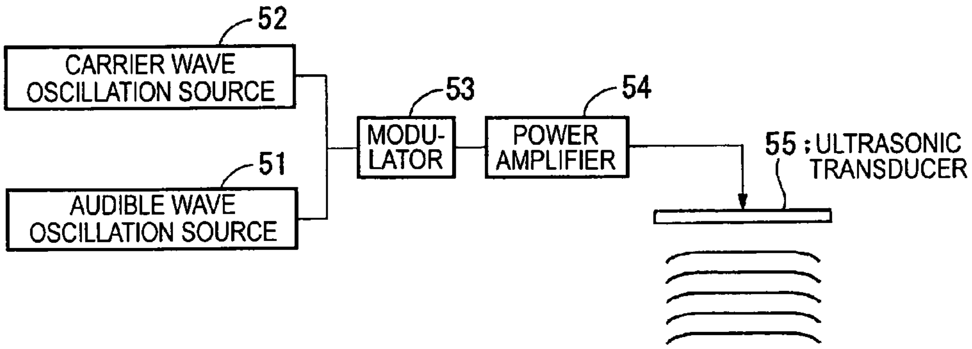
FIG. 10 is a block diagram showing the configuration of an ultrasonic speaker according to an embodiment of the invention.

Then, a configuration of an ultrasonic speaker according to an embodiment of the invention is shown in FIG. 10. The ultrasonic speaker according to the present embodiment uses the electrostatic ultrasonic transducer (FIG. 1) as an ultrasonic transducer 55.

In FIG. 10, the ultrasonic speaker according to the present embodiment includes an audible frequency wave oscillation source (a signal source) 51 for generating a signal wave in the audible frequency band, a carrier wave oscillation source (carrier wave supply means) 52 for generating and outputting a carrier wave in the ultrasonic frequency band, a modulator (modulation means) 53, a power amplifier 54, and an ultrasonic transducer (an electrostatic ultrasonic transducer) 55.

The modulator 53 modulates the carrier wave output from the carrier wave oscillation source 52 in accordance with the signal wave in the audible frequency band output from the audible frequency wave oscillation source 51, and supplies it to the ultrasonic transducer 55 via the power amplifier 54.

In the above configuration, the modulator 53 modulates the carrier wave in the ultrasonic frequency band output from the carrier wave oscillation source 52 in accordance with the signal wave output from the audible frequency wave oscillation source 51, and the ultrasonic transducer 55 is driven in accordance with the modulated signal amplified by the power amplifier 54. As a result, the modulated signal is converted into an acoustic wave with a finite amplitude level by the ultrasonic transducer 55, and the acoustic wave is emitted in a medium (in the air), thus the original signal sound in the audible frequency band is self-reproduced by the nonlinear effect of the medium (air).

Specifically, since acoustic waves are compressional waves transmitted by the medium of air, dense portions and nondense portions dominantly appear in the air in the process of transmitting modulated ultrasonic waves, and since the velocity of sound is high in the dense portions and low in the nondense portions, distortion is generated in the modulated wave itself, and as a result, waveform separation into carrier waves (ultrasonic wave frequency band) occurs, thus the signal waves (signal sound) in the audible wave frequency band can be reproduced.

As described above, if the wide band property of the high sound pressure is assured, it becomes possible to utilize it for various usages as a speaker. The ultrasonic waves are rapidly attenuated in the air, in proportion to the square of the frequency. Therefore, by using a lower carrier frequency (ultrasonic wave), the ultrasonic speaker capable of transmitting sound long as a beam with less attenuation can be provided.

On the contrary, since the higher carrier frequency causes rapid attenuation, the parametric array effect is not sufficiently exerted, and the ultrasonic speaker capable of spreading sound can be provided. These functions can selectively be used in the same ultrasonic speaker according to usages, and accordingly very effective.

Further, since dogs as pets, which often live together with humans, can hear sound of up to 40 kHz, and cats can hear sound of up to 100 kHz, it has an advantage of getting rid of an effect exerted to the pets by using the carrier frequency higher than such frequencies. Anyhow, lots of advantages can be obtained from the fact that it can be utilized with various frequencies.

According to the ultrasonic speaker according to the embodiment of the invention, the acoustic signal with sufficiently high sound pressure level for obtaining the parametric array effect can be generated throughout a wide frequency band.

Further, since the ultrasonic speaker according to the embodiment of the invention is configured using either one of the electrostatic ultrasonic transducers described in the above embodiments, in other words, since the through holes provided to the pair of electrodes in the electrostatic ultrasonic transducer are made function as resonance tubes, and the electrostatic ultrasonic transducer is driven and controlled so as to shift the mechanical resonance frequency of the vibration film and the acoustic resonance frequency of the through holes from each other, a high intensity ultrasonic wave can be generated throughout a wide frequency band, thus it becomes possible to improve electro-acoustic energy conversion efficiency.

Description of Configuration Example of Ultra-Directional Acoustic System According to the Invention Then, an ultra-directional acoustic system using the ultrasonic speaker configured using the electrostatic ultrasonic transducer according to the invention will be explained. The electrostatic ultrasonic transducer is a Push-Pull-type electrostatic ultrasonic transducer including a first electrode having a through hole, a second electrode having a through hole for forming a pair with the through hole of the first electrode, a vibration film held between a pair of electrodes composed of the first and the second electrodes and having a conductive layer to which a direct-current bias voltage is applied, holding the pair of electrodes and the vibration film, assuming that $\lambda$ is the wavelength of the carrier wave having a frequency shifted as a predetermined amount of frequency from the resonance frequency, which becomes the mechanical resonance frequency of the vibration film, setting the thickness t of each of the pair of electrodes to $(\lambda/4)\cdot n$ or roughly $(\lambda/4)\cdot n$ (where, $\lambda$ is the wavelength of the ultrasonic wave, n is a positive odd number), and applying an alternating-current signal as the modulated wave by modulating the carrier wave in the ultrasonic frequency band in accordance with the signal wave in the audible frequency band between the pair of electrodes.

Hereinafter, descriptions will be presented taking a projector as an example of the ultra-directional acoustic system according to the invention. It should be noted that the ultra-directional acoustic system according to the invention is not limited to the projector, but can be widely applied to display devices performing reproduction of sounds and pictures.

Figure 11:
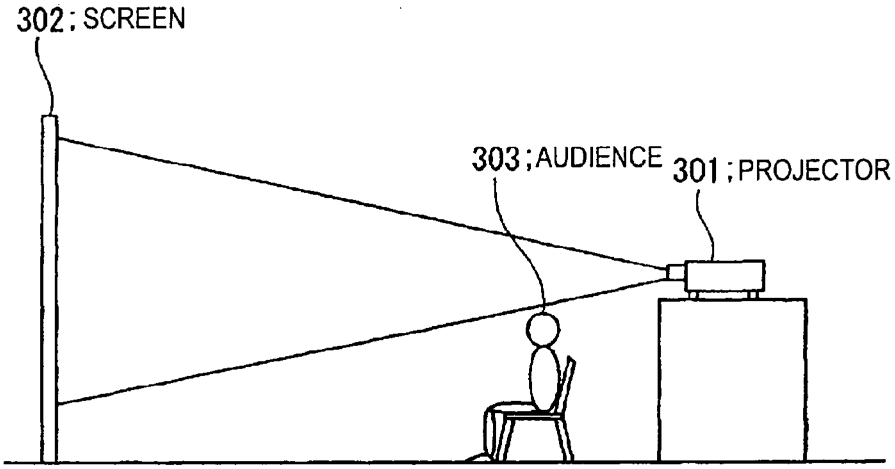
FIG. 11 is a diagram showing a state of use of a projector according to an embodiment of the invention.
Figure 12A:
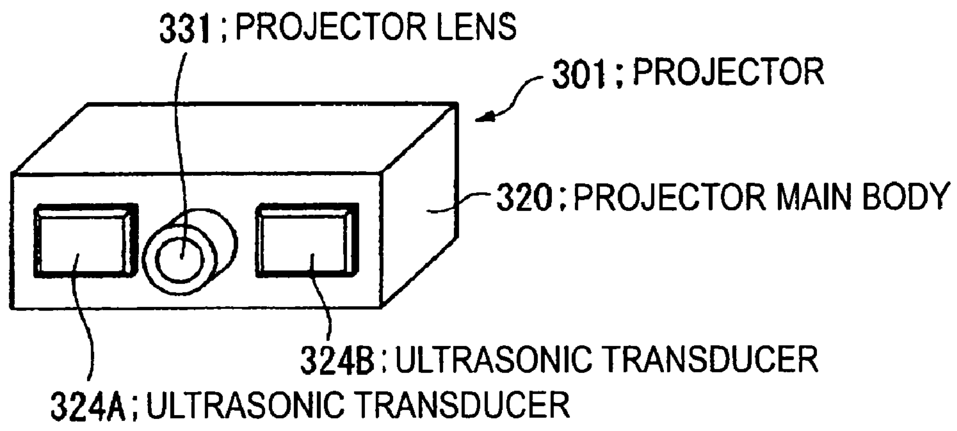
FIG. 12 is a diagram showing an external configuration of the projector shown in FIG. 11.
Figure 12B:
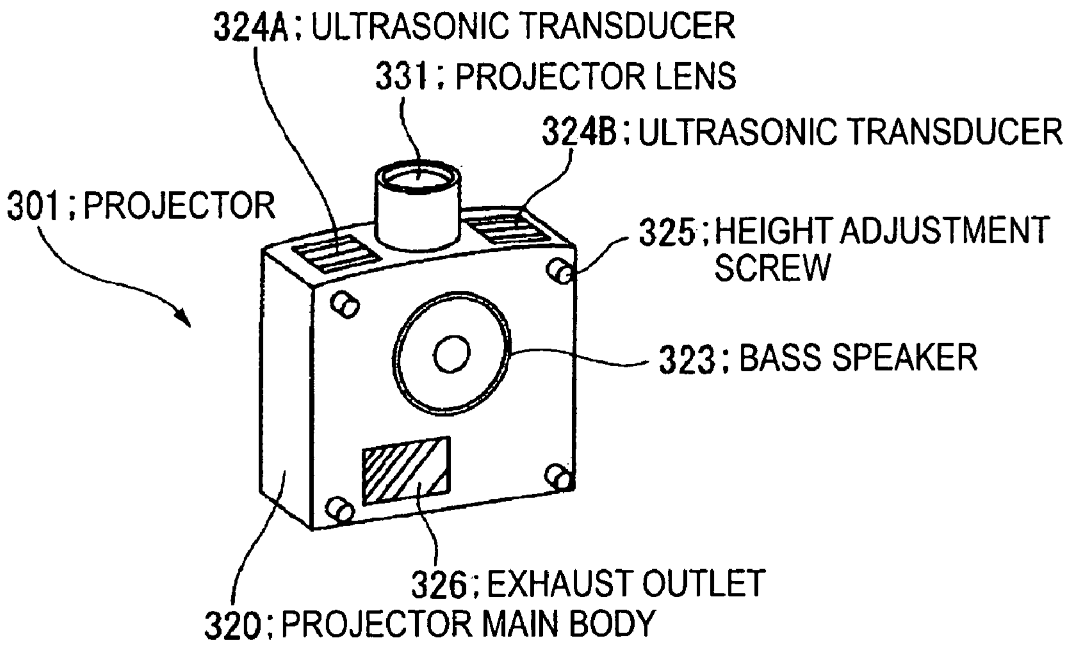

FIG. 11 shows a state of use of the projector according to the invention. As described in the drawing, a projector 301 is disposed behind the audience 303, and the pictures are projected on a screen 302 disposed in front of the audience 303 while a virtual sound source is formed on the projection surface of the screen 302 by the ultrasonic speaker implemented to the projector 301, thereby reproducing the sounds.

FIG. 5 shows the external configuration of the projector 301. The projector 301 is configured including a projector main body 320 including a projection optical system for projecting pictures on a projection surface such as a screen, and ultrasonic transducers 324A, 324B capable of oscillating an acoustic wave in the ultrasonic frequency band, and is integrally composed with the ultrasonic speaker for reproducing a signal sound in the audible frequency band from the audio signal supplied from an audio source. In the present embodiment, in order for reproducing a stereophonic sound signal, the ultrasonic transducers 324A, 324B configuring the ultrasonic speakers are implemented to the projector main body disposed across the projector lens 331 configuring the projection optical system on both sides thereof.

Further, the projector main body 320 is provided with a bass speaker 323 on the bottom thereof. Further, the reference numeral 325 denotes height adjustment screws for adjusting the height of the projector main body 320, the reference numeral 326 denotes an exhaust outlet for an air-cooling fan.

Further, the projector 301 uses the Push-Pull-type of electrostatic ultrasonic transducers according to the invention as the ultrasonic transducers configuring the ultrasonic speaker, thus the acoustic signal (the acoustic wave in the ultrasonic frequency band) in a wide frequency band can be oscillated with high sound pressure. Therefore, by controlling the spatial reproduction range of the reproduction signal in the audible frequency band by changing the frequency of the carrier wave, a projector capable of realizing such acoustic effects as obtained by a stereophonic surround system or a 5.1 channel surround system without requiring a huge acoustic system required in the past, and easy to be carried can be realized.

Figure 13:
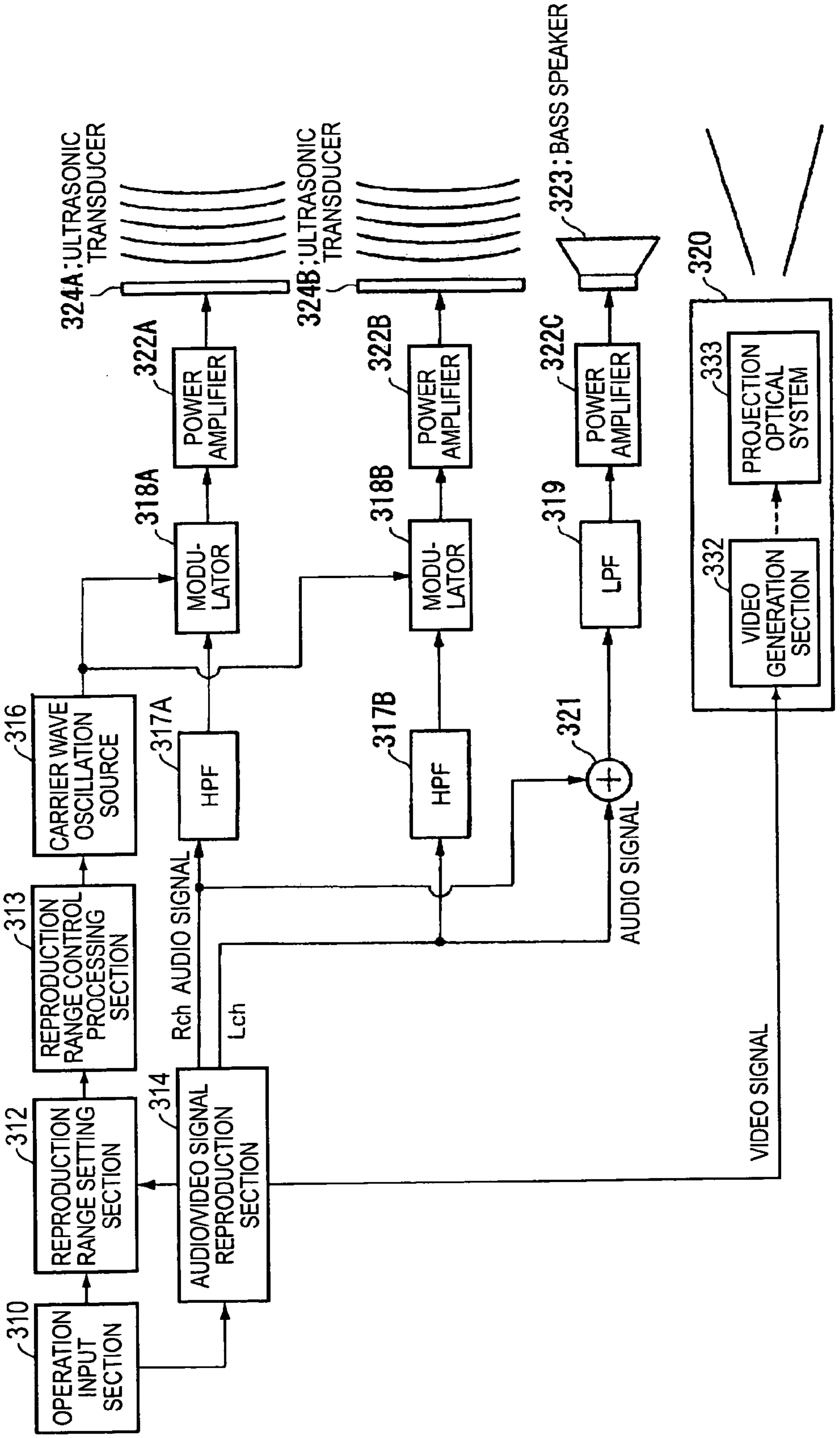
FIG. 13 is a block diagram showing an electrical configuration of the projector shown in FIG. 11.
Figure 14:
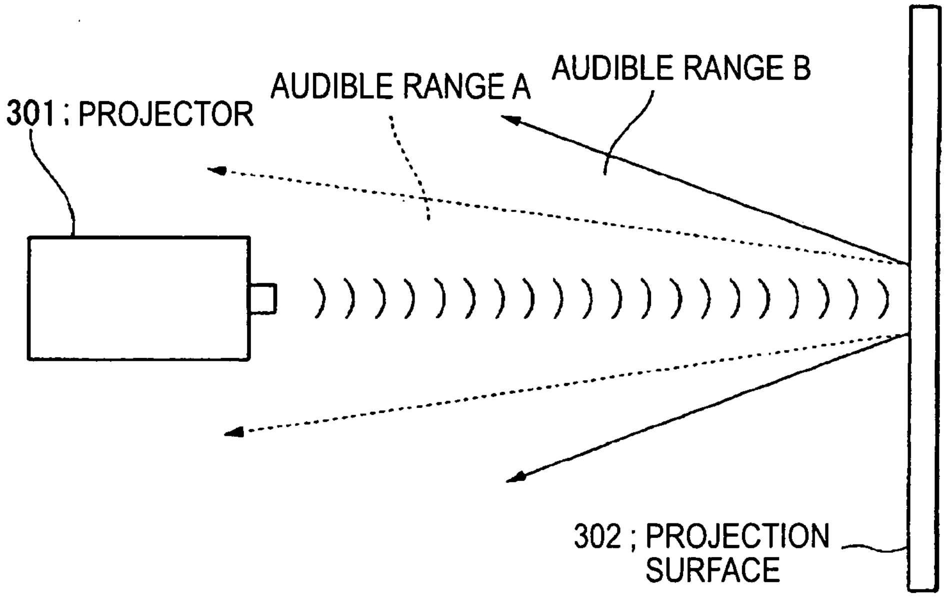
FIG. 14 is an explanatory diagram showing a reproduction state of a reproduction signal by the ultrasonic transducer.
Figure 15:
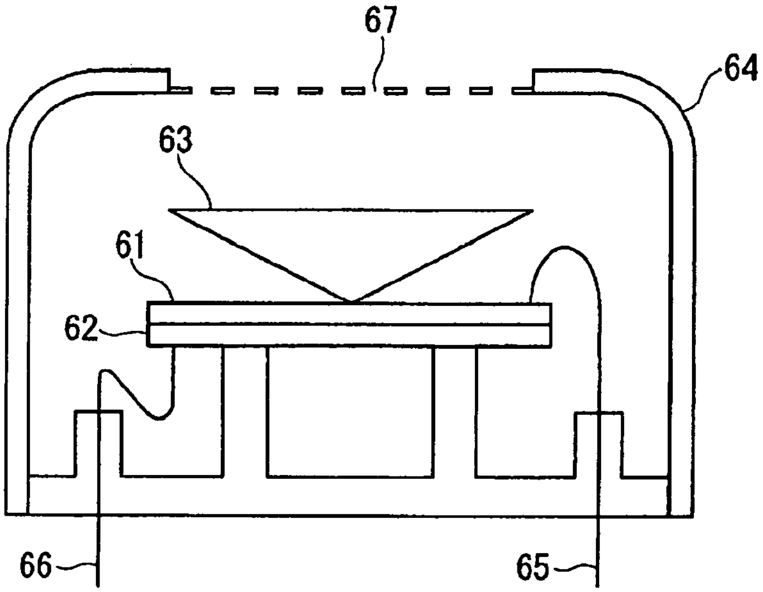
FIG. 15 is a diagram showing the configuration of the resonance-type ultrasonic transducer in the related art.
Figure 16:
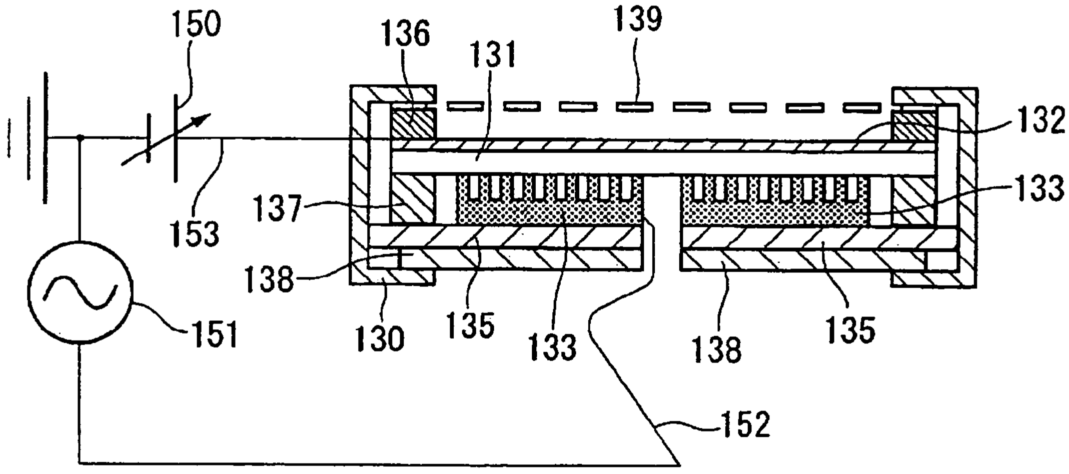
FIG. 16 is a diagram showing the specific configuration of the electrostatic-type of wide band vibration-type ultrasonic transducer in the related art.

Then, an electrical configuration of the projector 301 is shown in FIG. 13. The projector 301 includes a operation input section 310, an ultrasonic speaker, high-pass filters 317A, 317B, a low-pass filter 319, an adder 321, a power amplifier 322C, a bass speaker 323, and the projector main body 320, the ultrasonic speaker being composed of a reproduction range setting section 312, a reproduction range control processing section 313, an audio/video signal reproduction section 314, a carrier wave oscillation section 316, modulators 318A, 318B, power amplifiers 322A, 322B, and electrostatic ultrasonic transducers 324A, 324B. It should be noted that the electrostatic ultrasonic transducers 324A, 324B are the Push-Pull-type of electrostatic ultrasonic transducers according to the invention.

The projector main body 320 includes a video generation section 332 for generating video images and projection optical system 333 for projecting the generated video images on the projection surface. The projector 301 is composed of the ultrasonic speakers, a bass speaker 323, and the projector main body 320 integrated with each other.

The operation input section 310 has a numeric keypad, numeric keys, and various function keys including a power key for performing power-on and power-off. The reproduction range setting section 312 is arranged to allow input of data designating the reproduction range of the reproduction signal (signal sound) by the user performing key operation of the operation inputting section 310, and when the data is input, the frequency of the carrier wave for defining the reproduction range of the reproduction signal is set and held. The setting of the reproduction range of the reproduction signal is performed by designating the distance the reproduction signal can reach from the acoustic signal emission surfaces of the ultrasonic transducers 324A, 324B in the radial axis direction.

Further, the reproduction range setting section 312 is arranged to allow setting of the frequency of the carrier wave by the control signal output from the audio/video signal reproduction section 314 in accordance with the content of the video images.

Further, the reproduction range control processing section 313 has a function for referring to the setting content of the reproduction range setting section 312, and for controlling the carrier wave oscillation source 316 to change the frequency of the carrier wave generated by the carrier wave oscillation source 316 so that the set reproduction range is achieved.

For example, in the case in which the distance corresponding to the carrier wave frequency of 50 kHz is set as the internal information of the reproduction range setting section 312, it controls the carrier wave oscillation source 316 to oscillate at 50 kHz.

The reproduction range control processing section 313 has a storage section previously storing a table showing the relationship between the distance, which defines the reproduction range and which the reproduction signal can reach from the acoustic wave emission surfaces of the ultrasonic transducers 324A, 324B in the radial axis direction and the frequency of the carrier wave. The data in the table can be obtained by actually measuring the relationship between the frequency of the carrier wave and the reachable distance of the reproduction signal.

The reproduction range control processing section 313 refers to the table to obtain the frequency of the carrier wave corresponding to the set distance information in accordance with the contents of the setting in the reproduction range setting section 312, thus controlling the carrier wave oscillation source 316 to achieve the frequency.

The audio/video signal reproduction section 314 is, for example, a DVD player using a DVD as a video medium, and it is arranged that the R-channel audio signal out of the reproduced audio signals is output to the modulator 318A via the high-pass filter 317A while the L-channel audio signal thereof is output to the modulator 318B via the high-pass filter 317B, and the video signal is output to the video generation section 332 of the projector 320, respectively.

Further, it is arranged that the R-channel audio signal and the L-channel audio signal output from the audio/video signal reproduction section 314 are combined by the adder 321, and then input to the power amplifier 322C via the low-pass filter 319. The audio/video signal reproduction section 314 corresponds to an audio source.

The high-pass filters 317A, 317B are each provided with a characteristic of transmitting only the frequency component corresponding to middle/high pitch sound in the R-channel or L-channel audio signal, and the low-pass filter is provided with a characteristic of transmitting only the frequency component corresponding to low pitch sound in the R-channel and L-channel audio signals.

Therefore, the audio signals corresponding to the middle/high pitch sound out of the R-channel and L-channel audio signals are respectively reproduced by the ultrasonic transducers 324A, 324B, and the audio signal corresponding to the low pitch sound out of the R-channel and L-channel audio signals is reproduced by the bass speaker 323.

It should be noted that the audio/video signal reproduction section 314 is not limited to the DVD player, but can be a reproduction device for reproducing a video signal input from the outside. Further, the audio/video signal reproduction section 314 is provided with a function for outputting a control signal designating the reproduction range to the reproduction range setting section 312, thus dynamically changing the reproduction range of the reproduced sound for exerting acoustic effects corresponding to the scenes of the video images to be reproduced.

The carrier wave oscillation source 316 is provided with a function for generating the carrier wave with the frequency in the ultrasonic frequency band designated by the reproduction range setting section 312 and outputting it to the modulators 318A, 318B.

The modulators 318A, 318B are each provided with a function for performing AM modulation on the carrier wave supplied from the carrier wave oscillation source 316 in accordance with the audio signal in the audible frequency band output from the audio/video signal reproduction section 314 and outputting the modulated signal to respective one of the power amplifiers 322A, 322B.

The ultrasonic transducers 324A, 324B are driven by the modulated signals output from the modulators 318A, 318B via the power amplifiers 322A, 322B, respectively, and are each provided with a function for converting the modulated signal into an acoustic wave with a finite amplitude level to emit it in the medium, thereby reproducing the signal sound (reproduction signal) in the audible frequency band.

The video generation section 332 includes a display such as a liquid crystal display or a plasma display panel (PDP), a drive circuit for driving the display in accordance with the video signal output from the audio/video signal reproduction section 314, and so on, and generates video images obtained from the video signal output from the audio/video signal reproduction section 314.

The projection optical system 333 is provided with a function for projecting the video image displayed on the display on a projection surface such as a screen disposed in front of the projector main body 320.

The operation of the projector 301 composed of the above configuration will now be described. Firstly, the data (distance information) for designating the reproduction range of the reproduction signal is set to the reproduction range setting section 312 from the operation input section 310 in response to the key operation by the user, and the reproduction instruction to the audio/video signal reproduction section 314 is performed.

As a result, the distance information for defining the reproduction range is set to the reproduction range setting section 312, and the reproduction range control processing section 313 retrieves the distance information set to the reproduction range setting section 312, refers to the table stored in the built-in storage section, obtains the frequency of the carrier wave corresponding to the set distance information, and controls the carrier wave oscillation source 316 to generate the carrier wave with the frequency.

As a result, the carrier wave oscillation source 316 generates the carrier wave with the frequency corresponding to the distance information set in the reproduction range setting section 312, and outputs it to the modulators 318A, 318B.

Meanwhile, the audio/video signal reproduction section 314 outputs the R-channel audio signal out of the reproduced audio signals to the modulator 318A via the high-pass filter 317A, the L-channel audio signal thereof to the modulator 318B via the high-pass filter 317B, outputs the R-channel audio signal and the L-channel audio signal to the adder 321, and the video signal to the video generation section 332 of the projector 320, respectively.

Therefore, the audio signal of the middle/high pitch sound in the audio signal of the R-channel is input to the modulator 318A by the high-pass filter 317A while the audio signal of the middle/high pitch sound in the audio signal of the L-channel is input to the modulator 318B by the high-pass filter 317B.

Further, the audio signal of the R-channel and the audio signal of the L-channel are combined by the adder 321, and the audio signal of the low pitch sound in the audio signals of the R-channel and the L-channel is input to the power amplifier 322C by the low-pass filter 319.

The video generation section 332 drives the display in accordance with the input video signal to generate and display the video images. The video image displayed on the display is projected on the projection surface such as the screen 302 shown in FIG. 11 by the projection optical system 333.

Meanwhile, the modulator 318A performs the AM modulation on the carrier wave output from the carrier wave oscillation source 316 in accordance with the audio signal of the middle/high pitch sound in the R-channel audio signal output from the high-pass filter 317A, and output it to the power amplifier 322A.

Further, the modulator 318B performs the AM modulation on the carrier wave output from the carrier wave oscillation source 316 in accordance with the audio signal of the middle/high pitch sound in the L-channel audio signal output from the high-pass filter 317B, and output it to the power amplifier 322B.

The modulated signals amplified by the power amplifiers 322A, 322B are respectively applied between the upper electrode 10A and the lower electrode 10B (see FIG. 1) of the ultrasonic transducers 324A, 324B, and converted into acoustic waves (acoustic signals) with finite amplitude levels to be emitted in the medium (in the air), thus the audio signal of the middle/high pitch sound in the R-channel audio signal is reproduced from the ultrasonic transducer 324A, and the audio signal of the middle/high pitch sound in the L-channel audio signal is reproduced from the ultrasonic transducer 324B.

Further, the audio signal of the low pitch sound in the R-channel and the L-channel amplified by the amplifier 322C is reproduced from the bass speaker 323.

As described above, in the transmission of the ultrasonic wave emitted in the medium (in the air) by the ultrasonic transducer, the velocity of sound becomes high in the portions with high sound pressure, and the velocity of sound becomes low in the portions with low sound pressure in accordance with the transmission. As a result of the above, distortion is caused in the waveform.

In the case in which the signal (the carrier wave) in the ultrasonic frequency band to be emitted has been modulated (AM modulation) with the signal in the audible frequency band, as a result of the waveform distortion described above, the signal wave in the audible frequency band used in the modulation process is formed while being separated from the carrier wave in the ultrasonic frequency band and self-demodulated. On this occasion, the spread of the reproduction signal is shaped like a beam in the nature of ultrasonic waves, the sound is reproduced only in a specific direction completely different from normal speakers.

The beam shaped reproduction signal output from the ultrasonic transducer 324 forming the ultrasonic speaker is emitted towards the projection surface (the screen) on which the video image is projected by the projection optical system 333, and reflected by the projection surface to be diffused. In this case, the reproduction range varies because the distance from the acoustic wave emitting surface of the ultrasonic transducer 324 to the point in the radial axis direction (the normal line direction) where the reproduction signal is separated from the carrier wave and the width of the beam (the spread angle of the beam) of the carrier wave vary in accordance with the frequency of the carrier wave set in the reproduction range setting section 312.

FIG. 11 shows the state of the reproduction signal in the reproduction process by the ultrasonic speaker configured including the ultrasonic transducers 324A, 324B in the projector 301. In the projector 301, when the ultrasonic transducer is driven with the modulated signal obtained by modulating the carrier wave with the audio signal, if the carrier frequency set by the reproduction range setting section 312 is low, the distance from the acoustic wave emitting surface to the point in the radial axis direction (the direction of the normal line of the acoustic wave emitting surface) where the reproduction signal is separated from the carrier wave, namely, the distance to the reproduction point becomes longer.

Therefore, it is resulted that the beam of the reproduction signal in the audible frequency band thus reproduced reaches the projection surface (the screen) 302 with relatively small spread, and is reflected by the projection surface 302 in the present state, and accordingly, the reproduction range becomes an audible range A illustrated with the dot-line arrow in FIG. 11, resulting in the state in which the reproduction signal (reproduction sound) can be heard only in a relatively far from the projection surface 302 and narrow range.

On the other hand, if the carrier frequency set by the reproduction range setting section 312 is higher than the case described above, although the acoustic wave emitted from the acoustic wave emitting surface of the ultrasonic transducer 324 is narrowed down compared to the case with a lower carrier frequency, the distance from the acoustic wave emitting surface to the point in the radial axis direction (the direction of the normal line of the acoustic wave emitting surface) where the reproduction signal is separated from the carrier wave, namely, the distance to the reproduction point becomes shorter.

Therefore, it is resulted that the beam of the reproduction signal in the audible frequency band thus reproduced reaches the projection surface 302 after being spread, and is reflected by the projection surface 302 in the present state, and accordingly, the reproduction range becomes an audible range B illustrated with the solid-line arrow in FIG. 7, resulting in the state in which the reproduction signal (reproduction sound) can be heard only in a relatively near from the projection surface and wide range.

As explained above, the projector according to the Invention uses the ultrasonic speaker using the Push-Pull-type or Pull-type of electrostatic ultrasonic transducers according to the invention, thus reproducing the acoustic signals so as to be seen from the virtual sound sources formed in the vicinity of the acoustic wave reflecting surface such as a screen with sufficient sound pressure and a wide frequency characteristic. Therefore, it becomes possible to easily control the reproduction range. Further, as already described before, in the electrostatic ultrasonic transducer, the directivity control of the sound emitted from the ultrasonic speaker can be performed by dividing the vibration area of the vibration film into a plurality of blocks, and driving and controlling the phase of the alternating-current signal applied between the electrode layer of the vibration film and each of the blocks of the vibration electrode pattern to have predetermined phase difference between the adjacent blocks.

Further, since the projector according to the invention uses the Push-Pull-type of electrostatic ultrasonic transducer driven and controlled so as to shift the mechanical resonance frequency of the vibration film and the acoustic resonance frequency of the through holes from each other, the high intensity ultrasonic wave can be emitted throughout a wide frequency band, thus improvement of the sound quality of the reproduced sound can be achieved.

Although the embodiments of the invention are hereinabove explained, the electrostatic ultrasonic transducer and the ultrasonic speaker according to the invention are not limited to only the illustrated examples described above, but various modifications can obviously be added thereto within the scope of the invention.

INDUSTRIAL APPLICABILITY

The ultrasonic transducer according to the embodiment of the invention can be applied to various sensors such as a ranging sensor, and further, as already described above, it can be applied to a sound source for directional speakers, ideal impulse signal sources, and so on.

What is claimed is:

1. An ultrasonic speaker, comprising:

an electrostatic ultrasonic transducer, including a first electrode having a through hole, a second electrode having a through hole, a vibration film held between a pair of electrodes composed of the first electrode and the second electrode disposed so that the through hole of the first electrode and the through hole of the second electrode forms a pair, and having a conductive layer to which a direct-current bias voltage is applied, a modulated wave obtained by modulating a carrier wave in an ultrasonic frequency band with a signal wave in an audible frequency band being applied between the pair of electrodes, the through holes provided to the pair of electrodes acting as resonance tubes;

a mechanical resonance frequency of the vibration film and an acoustic resonance frequency of the through holes being shifted from each other, a signal source for generating the signal wave in the audible frequency band;

carrier wave supplying means that generates and outputs the carrier wave in the ultrasonic frequency band; and modulation means that modulates the carrier wave with the signal wave in the audible frequency band output from the signal source, wherein the electrostatic ultrasonic transducer is driven with a modulated signal output from the modulation means and applied between the pair of electrodes and an electrode layer of the vibration film.

2. An ultrasonic speaker comprising:

an electrostatic ultrasonic transducer, including a first electrode having a through hole, a second electrode having a through hole, a vibration film held between a pair of electrodes composed of the first electrode and the second electrode disposed so that the through hole of the first electrode and the through hole of the second electrode forms a pair, and having a conductive layer to which a direct-current bias voltage is applied, wherein a modulated wave obtained by modulating a carrier wave in an ultrasonic frequency band with a signal wave in an audible frequency band being applied between the pair of electrodes, assuming that λ is the wavelength of the carrier wave having a frequency shifted as a predetermined amount of frequency from a resonance frequency, a mechanical resonance point of the vibration film, a thickness t of each of the pair of electrodes is set to one of $(\lambda/4)\cdot n$ and roughly $(\lambda/4)\cdot n$, where λ is a wavelength of the carrier wave (ultrasonic wave), and n is a positive odd number, a signal source for generating the signal wave in the audible frequency band;

carrier wave supplying means that generates and outputs the carrier wave in the ultrasonic frequency band; and modulation means that modulates the carrier wave with the signal wave in the audible frequency band output from the signal source, wherein the electrostatic ultrasonic transducer is driven with a modulated signal output from the modulation means and applied between the pair of electrodes and an electrode layer of the vibration film.

3. The ultrasonic speaker according to claim 2, wherein a sound reflecting plate is disposed on a rear side of the electrostatic ultrasonic transducer, the sound reflecting plate emitting the ultrasonic wave emitted from each of opening sections on the rear side to a front side of the electrostatic ultrasonic transducer by paths all having the same lengths.

4. The ultrasonic speaker according to claim 3, wherein the sound reflecting plate includes a pair of first reflecting plates located at a central position of the rear side of the ultrasonic transducer in one end, disposed at an angle of 45° with the both sides of the rear side of the ultrasonic transducer with respect to the central position, and having lengths as long as to conform the other ends to the end sections of the ultrasonic transducer, and a pair of second reflecting plates respectively connected to the first reflecting plates in the outward direction of the first reflecting plates having the same length as the first reflecting plate at a right angle with the end section of the first reflecting plates.

* * * * *